United States Patent [19]
Winkelman

[11] Patent Number: 5,668,890
[45] Date of Patent: Sep. 16, 1997

[54] METHOD AND APPARATUS FOR THE AUTOMATIC ANALYSIS OF DENSITY RANGE, COLOR CAST, AND GRADATION OF IMAGE ORIGINALS ON THE BASIS OF IMAGE VALUES TRANSFORMED FROM A FIRST COLOR SPACE INTO A SECOND COLOR SPACE

[75] Inventor: Kurt-Helfried Winkelman, Kiel, Germany

[73] Assignee: Linotype-Hell AG, Eschborn, Germany

[21] Appl. No.: 699,189

[22] Filed: Aug. 19, 1996

Related U.S. Application Data

[63] Continuation of Ser. No. 299,140, Sep. 1, 1994, abandoned, which is a continuation of Ser. No. 43,276, Apr. 6, 1993, abandoned.

[30] Foreign Application Priority Data

Apr. 6, 1992 [DE] Germany ............... 42 11 444.6
Apr. 2, 1993 [DE] Germany ............... 43 10 727.3

[51] Int. Cl.⁶ ........................... G06K 9/00
[52] U.S. Cl. ............... 382/167; 345/154; 358/521
[58] Field of Search ............... 382/162, 167, 382/276; 358/518, 520, 521, 522; 345/153, 154; 395/131

[56] References Cited

U.S. PATENT DOCUMENTS

| | | | |
|---|---|---|---|
| 4,574,393 | 3/1986 | Blackwell et al. | 382/17 |
| 4,679,074 | 7/1987 | Sugiura et al. | 358/523 |
| 4,727,434 | 2/1988 | Kawamura | 358/448 |
| 4,731,671 | 3/1988 | Alkafer | 358/522 |
| 4,812,903 | 3/1989 | Wagensonner et al. | 358/521 |
| 4,941,039 | 7/1990 | D'Errico | 358/523 |
| 4,958,217 | 9/1990 | Kimura et al. | 358/504 |
| 4,972,257 | 11/1990 | Birnbaum et al. | 358/520 |
| 4,984,071 | 1/1991 | Yonezawa | 358/521 |
| 5,042,078 | 8/1991 | Oshikoshi et al. | 382/167 |
| 5,121,224 | 6/1992 | Ng et al. | 382/51 |
| 5,222,154 | 6/1993 | Graham et al. | 382/17 |
| 5,233,413 | 8/1993 | Fuchsberger | 358/518 |
| 5,233,684 | 8/1993 | Ulichney | 345/154 |
| 5,268,754 | 12/1993 | Van De Capelle et al. | 382/162 |
| 5,278,641 | 1/1994 | Sekizawa et al. | 382/51 |
| 5,398,124 | 3/1995 | Hirota | 358/518 |
| 5,414,529 | 5/1995 | Terada et al. | 358/518 |
| 5,422,738 | 6/1995 | Ishihara et al. | 358/500 |
| 5,436,739 | 7/1995 | Imao et al. | 358/518 |
| 5,438,649 | 8/1995 | Ruetz | 358/518 |
| 5,467,438 | 11/1995 | Nishio et al. | 395/131 |
| 5,502,458 | 3/1996 | Braudaway et al. | 345/153 |
| 5,517,333 | 5/1996 | Tamura et al. | 358/158 |
| 5,517,334 | 5/1996 | Morag et al. | 358/518 |
| 5,544,284 | 8/1996 | Allebach et al. | 395/131 |
| 5,568,284 | 10/1996 | Oku et al. | 358/521 |

*Primary Examiner*—Joseph Mancuso
*Assistant Examiner*—Jayanti K. Patel
*Attorney, Agent, or Firm*—Hill, Steadman & Simpson

[57] ABSTRACT

A method and apparatus for analysis of an image original to be reproduced by evaluating image values (R, G, B) acquired by the point-by-point and line-by-line, trichromatic scanning. The image values of a first color space allocated to the input apparatus are transformed into image values of a second color space that is independent of the first color space. The analysis of the image original for calculating setting values for image processing is implemented on the basis of the transformed image values of the second color space. The master analysis on the basis of the image values is implemented in view of image scope, image gradation and/or color cast.

13 Claims, 14 Drawing Sheets

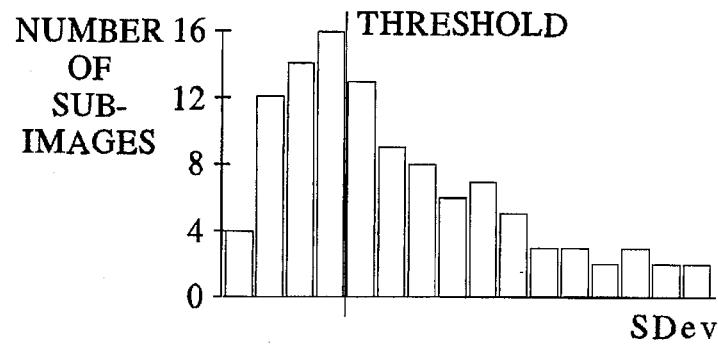
FIG.8A
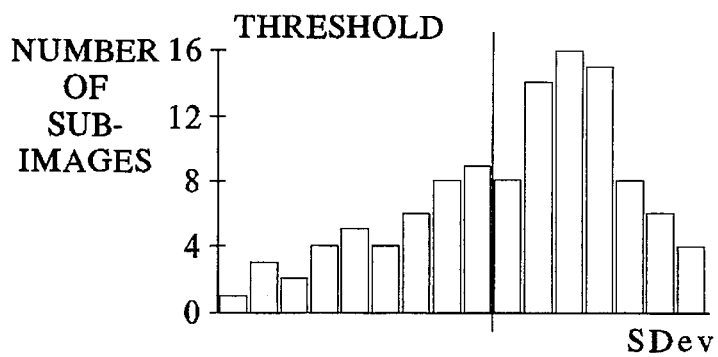
FIG.8B
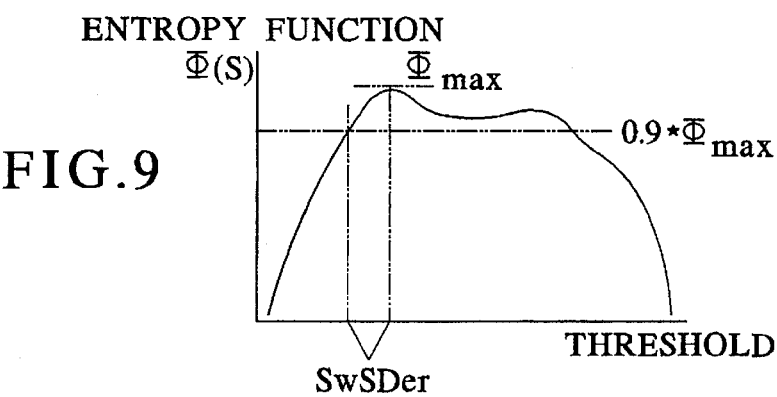
FIG.9
FIG.12A     FIG.12B
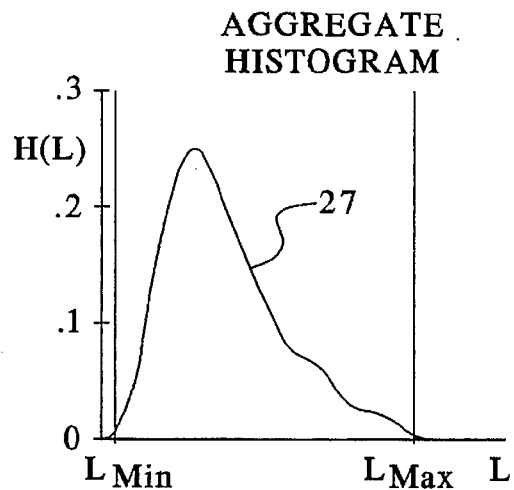
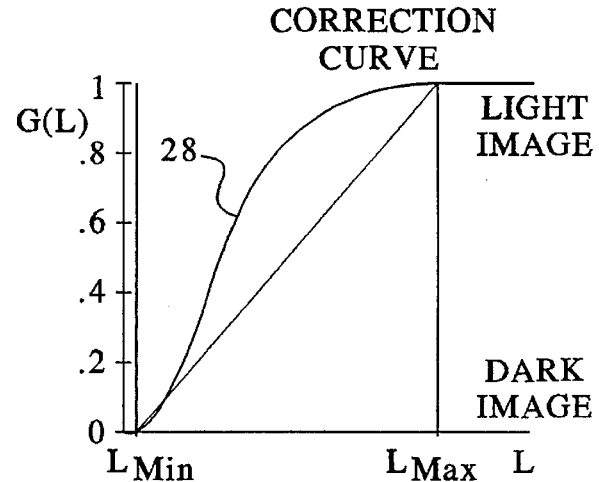

METHOD AND APPARATUS FOR THE AUTOMATIC ANALYSIS OF DENSITY RANGE, COLOR CAST, AND GRADATION OF IMAGE ORIGINALS ON THE BASIS OF IMAGE VALUES TRANSFORMED FROM A FIRST COLOR SPACE INTO A SECOND COLOR SPACE

This is a continuation of application Ser. No. 08/299,140, filed Sep. 1, 1994, now abandoned, which is a continuation of application Ser. No. 08/043,276, filed Apr. 6, 1993, now abandoned.

BACKGROUND OF THE INVENTION

The invention is generally directed to methods and apparatus for electronic reproduction of images. More specifically, the invention relates to a method and to an apparatus for the analysis of image originals for acquiring setting parameters for image setting in apparatus and systems for electronic image processing. What is to be understood herein by the term "image originals" are black-and-white original images and color original images.

Electronic image processing is essentially composed of the steps of image input, image processing and image output.

In the image input step, utilizing, for example, a color image scanner (scanner) as image input device, three primary color value signals (R, G, B) relating to the image original can be acquired. These signals generally are acquired with an optoelectronic scanner element on the basis of trichromatic as well as pixel-by-pixel and line-by-line scanning of the color image original to be reproduced, whereby the individual color value triads represent the color components "red" (R), "green" (G) and "blue" (B) in the color original. The analog color values are converted into digital color values and are stored for use in the following image processing step.

In the image processing step, the color values (R, G, B) are usually first converted into color separation values (C, M, Y, K) according to subtractive color mixing protocols, these being a measure for the dosing of the inks "cyan" (C), "magenta" (M), "yellow" (Y) and "black" (K) or, respectively, for the raster point sizes or raster percentages employed in the later printing process. Over and above this, various image parameters such as image light (or exposure) values and image depth values for an adaptation of the image scope, an image gradation characteristic for a correction of contrast or for a correction of overexposures and underexposures, as well as color cast values for a correction of color cast are set. Further, local and selective color corrections can also be undertaken, with the goal of improving the image reproduction, of compensating deficiencies or of undertaking editorial changes.

After the image processing step, the image output step is undertaken with a suitable image output device, for example a color separation printer or recorder for the rastered recording of color separations on a film material can be used.

The setting of the image parameters by an operator usually begins with the operator first pre-setting standard values that he identifies based on a rough pre-classification of the appertaining image original or based on an experienced guess. While setting the image parameters, the operator makes use of the measuring functions of the image input device in that he measures characteristic picture elements in the color original with the optoelectronic scanner element with respect to image scope, color cast and brightness distribution and uses the measured results for finding optimum setting values. The interpretation of the measured results and their conversion into optimum setting values for the image setting require a great deal of experience and often present difficulties for an unexperienced operator.

For parameterization of an image input device, it is already known to employ an automatic master analysis of the image original to be reproduced in view of image scope, image gradation and color casts and to use the results of the analysis for calculating image-dependent pre-setting values for setting the image parameters. Master analyses are known for image scope analyses, image gradation analyses and color cast analyses. The operator can then evaluate the result of the image analysis and transfer the offered pre-setting values directly into the device or modify or, respectively, correct them on the basis of measurement functions in order to undertake an optimum setting. As a result, the operator is relieved of routine jobs and can concentrate on the processing of color originals wherein global or selective color corrections are additionally required for improving the reproduction quality.

The known methods for master analysis are based on the color values (R, G, B) of the device-dependent RGB color space acquired from the respective image input device, whereby the analysis of the image scope and of the color cast is implemented with direct reference to the color values (R, G, B), whereas a brightness or luminance signal derived from the color values (R, G, B) is often employed for analysis of the image gradation.

The known methods for master analysis have the disadvantage that, given the connection of various image input devices, they must be specifically matched to the properties of the color values (R, G, B) of the respective image input devices.

The known methods for master analysis are also calculation-intensive, since the color values (R, G, B) acquired with the image input devices for the analysis must first be resolved into two color components and into a brightness component.

SUMMARY OF THE INVENTION

The present invention provides methods and apparatus for analysis of image originals that work faster, more simply and more precisely than such prior methods and apparatus.

To these ends, the invention provides that:

the image values (R, G, B) of a first color space allocated to the input device are transformed into functionally appertaining image values (L*, a*, b*) of a second color space that is independent of the first color space; and the master analysis of the image original for calculating setting values for the image processing is implemented with reference to the transformed image values (L*, a*, b*) of the second color space.

Advantageously, the master analysis is implemented in view of image scope, image gradation and/or color cast.

As a result of the transformation of the color space into a color space that is in conformity with sensation, for example into the CIELAB color space, the image values to be analyzed are separated into a brightness (or luminosity or luminance) component L* and into color components a* and b*, so that the time-consuming conversions are eliminated. The analyses for image scope and for gradation are implemented utilizing of the luminosity component L*, whereas the color components a* and b* are utilized for the analysis of a potential color cast.

In the analysis of the image scope, the frequency distribution of the luminosity component L* (luminosity histogram) of the transformed image values L*, a*, b* in the color original is defined. Subsequently, the image light (or exposure) value (brightest relevant luminosity value) of the image original and the image depth value (darkest relevant luminosity value) of the image original are calculated from the frequency distribution by determining the maximum and minimum luminosity value L* depending on the curve of the frequency distribution in the light image and dark image region.

In the analysis of image gradation, the frequency distribution of the luminosity values is advantageously determined only from those regions of an image original that are important for the image (rich in structure), i.e., image-critical. To that end, the image original is first subdivided into sub-images. Histograms of the luminosity values in the form of sub-image histograms are separately determined for every sub-image. The sub-image histograms are statistically evaluated and the sub-images important to the image are classified as critical sub-images. An aggregate histogram is calculated from the sub-image histograms of the critical sub-images, this aggregate histogram corresponding to the frequency distribution of the luminosity values from the regions of the important to the image original. A correction curve for the image gradation characteristic is then derived from the aggregate histogram according to a histogram modification method.

In the analysis of color cast, the region of the highest luminance or luminosity values (light image region) and/or the region of the lowest luminosity values (dark image region) of the luminosity component L* of the color values in the color original to be analyzed is/are subdivided into at least one luminosity region for the reliable acquisition of a color cast in a color original. The color cast is determined in the respective luminosity region (or range) as an average deviation of the color values from achromatic by pixel-by-pixel averaging of the color components a* and b* of the color values in the corresponding luminosity regions (or ranges). The color cast to be utilized for the evaluation of the color cast analysis is then formed by selection and/or a combination of color casts identified for the luminosity regions (or ranges).

As a result of the foregoing procedures of the invention in the analysis of image scope, image gradation and color cast, a method and an apparatus implementing the method with improved precision, implementability and speed are provided.

These and other features of the invention are set forth below in greater detail in the following detailed description of the presently preferred embodiments and accompanying drawings.

BRIEF DESCRIPTION OF THE DRAWINGS

FIG. 8 illustrates a frequency distribution of a histogram parameter for the method for analysis of the image gradation;

FIG. 9 illustrates a typical course of an entropy function in connection with the method for the analysis of the image gradation;

FIG. 12 is a graphic illustration of the determination of a correction curve in connection with the method for the analysis of the image gradation;

DETAILED DESCRIPTION OF THE PRESENTLY PREFERRED EMBODIMENTS

Figure 1:
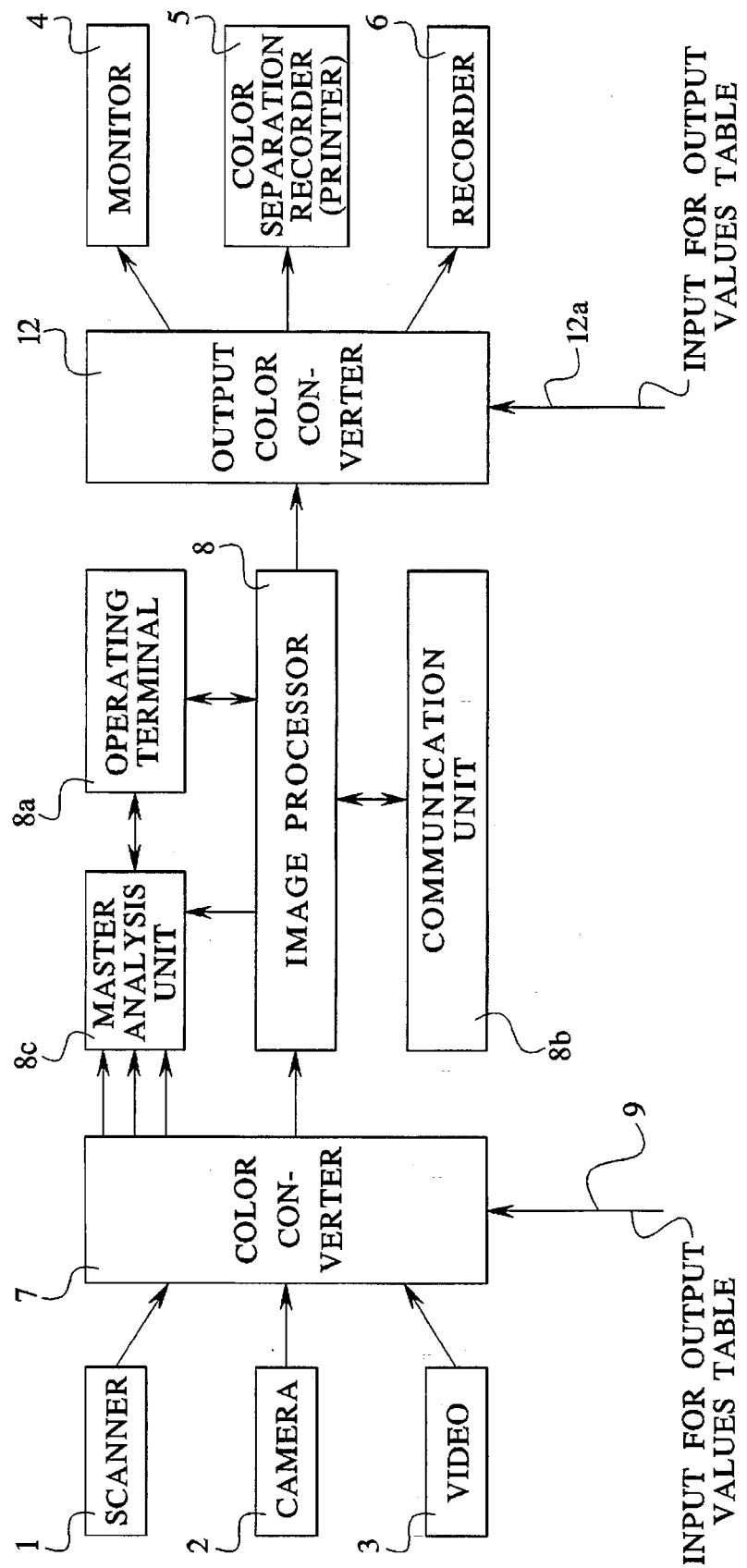
FIG. 1 illustrates a schematic diagram of a color image processing system.

In FIG. 1 there is illustrated the signal flow path in a color image processing system embodying principles of the invention. Input devices that scan point-by-point and line-by-line are represented by a scanner 1; devices that scan planarly are represented by a camera 2; and devices for producing colored, graphic data such as, for example, graphic design stations, are represented by a video input 3. Various output devices are represented by a monitor 4, a color separation recorder or printer 5 and a proof recorder 6.

The image values R, G and B of the respective, device-dependent color space generated in the input devices 1, 2, 3 are converted by an input color converter 7 into color values of a device-independent communication color space and thence are supplied to an image processing unit 8. The color conversion from the device-dependent color space into the communication color space ensues via a reference color system.

To that end, the input color converter 7, for example, is constructed as a memory table (LUT) wherein the output color values are addressably stored to be addressable by the appertaining input color values. The output values table is input into the input color converter 7 via an input 9. In addition, an input calibration of the color values is undertaken in the color conversion, an exact matching of the color spaces ensuing therein.

As illustrated in FIG. 1, the input color converter 7 can be a separate unit or can be a component part of an input device 1, 2 or 3 or of the image processing unit 8.

The color corrections and geometrical processing desired by an operator are implemented in the image processing unit 8 with reference to the transformed color values of the respectively employed communication color space. To that end, the image processing unit 8 is connected to an operating terminal 8a for the operator's use. The image processing unit 8 is also in communication with a communication unit 8b wherein the image values to be processed are intermediately stored.

A master analysis unit 8c is also provided, this unit 8c being connected to the image processing unit 8 and to the operating terminal 8a. Whether the master analysis is to ensue with respect to image scope, image gradation and/or color cast can be preselected via programming inputs of the master analysis unit 8c.

Before the master analysis is undertaken, the image original to be analyzed is scanned point-by-point and line-by-line in a scanner 1 with a resolution (coarse scan) coarser than the resolution required for the actual reproduction (fine scan) of the image signal. The image values R, G and B thereby acquired are digitized, are potentially pre-distorted according to a given function (e.g., a Munsell function), are converted in the color converter 7 into the image values of the selected communication color space 15, for example into the color values L*, a* and b*, and, finally, are stored in the communication unit 8b.

Subsequently, the image values L*, a* and b* of the coarse scan are loaded into the master analysis unit 8c and are investigated therein with respect to image scope, image gradation and/or color cast according to mathematical and statistical methods.

Image-dependent pre-setting values that are forwarded to the operating terminal 8a for setting the image parameters are derived as a result of the master analysis. The operator can directly transfer the pre-setting values into the image processing unit 8 for image setting or, on the other hand, can modify or, respectively, correct them in order to achieve an optimum setting.

After the image processing, the processed image values are read out from the image processing unit 8 and are convened into process color values in an output color converter 12 on the basis of an output color transformation, these process color values being supplied to the corresponding output devices 4, 5 and 6. A corresponding output calibration thereby occurs.

The color converter 10 can be constructed similar to the color converter 7 and can be constructed as a memory table to which a table of output color values are supplied via an input 12a.

Figure 2:
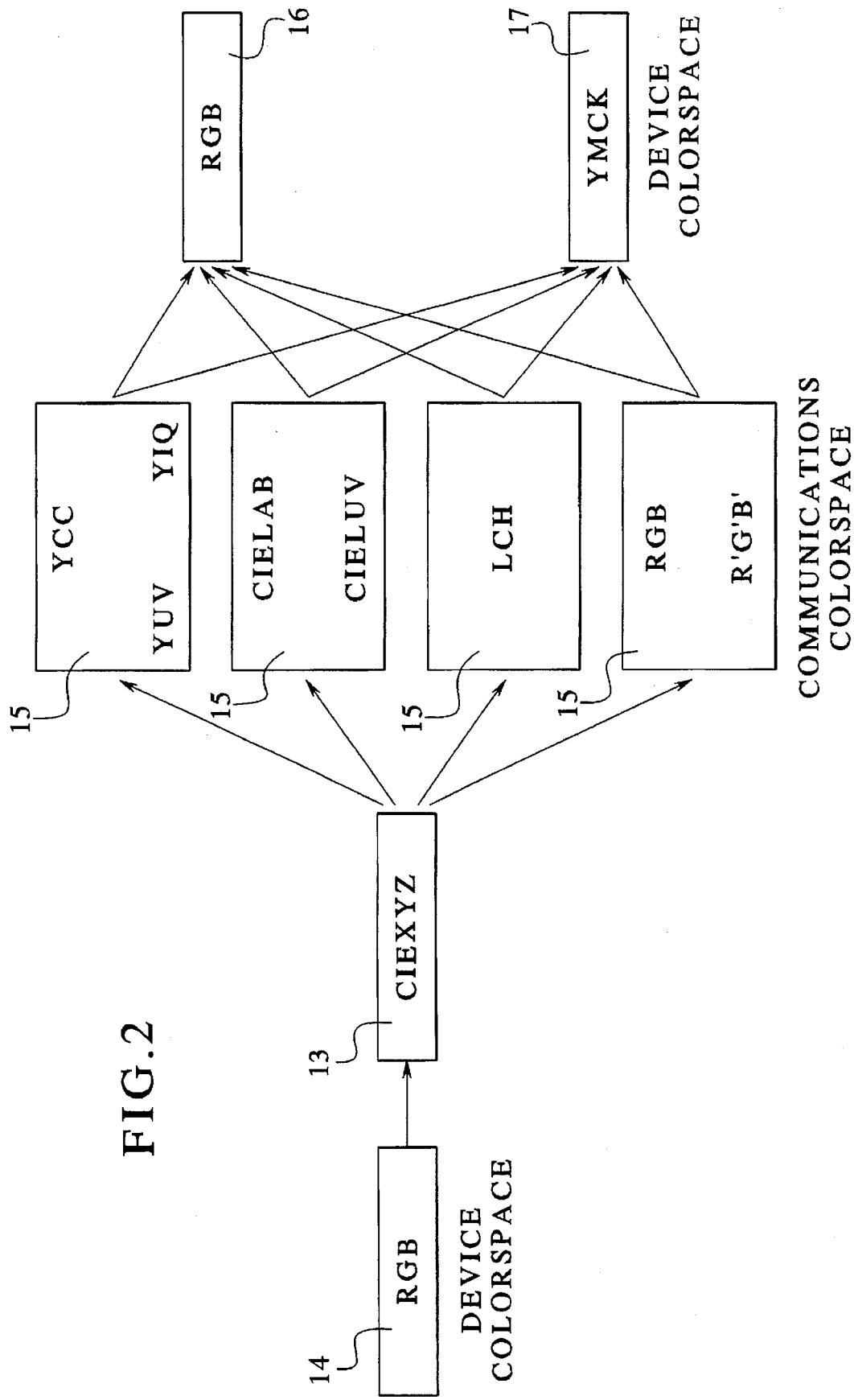
FIG. 2 illustrates a block diagram of a communications model for a color image processing system.

FIG. 2 illustrates a communication model of a color image processing system. The XYZ color value system (CIEXYZ) standardized by the Commission Internationale de l'Eclairage (CIE) [International Commission on Illumination] serves as a reference color system 13, this being based on the visual properties of the human eye. The color values R, G, B of the device-specific RGB color space 14 of the input devices 1, 2, 3 are mathematically transformed into the reference color system 13 by suitable input calibration. The color values X, Y, Z of the reference color system 13 are transformed by mathematically defined transformations into color values of a selectable, device-independent communication color space 15 with which the master analysis and the image processing can be carried out. Advantageously, communication color spaces 15, preferably the CIELAB color space, that are in conformity with sensation are employed for the master analysis. After the image processing, the transformation of the processed color values of the appertaining communication color space 15 into the process color values of the device-specific RGB color space 16 or, respectively, CMYK color space 17 of the output devices 4, 5 and 6 ensues.

Figure 3:
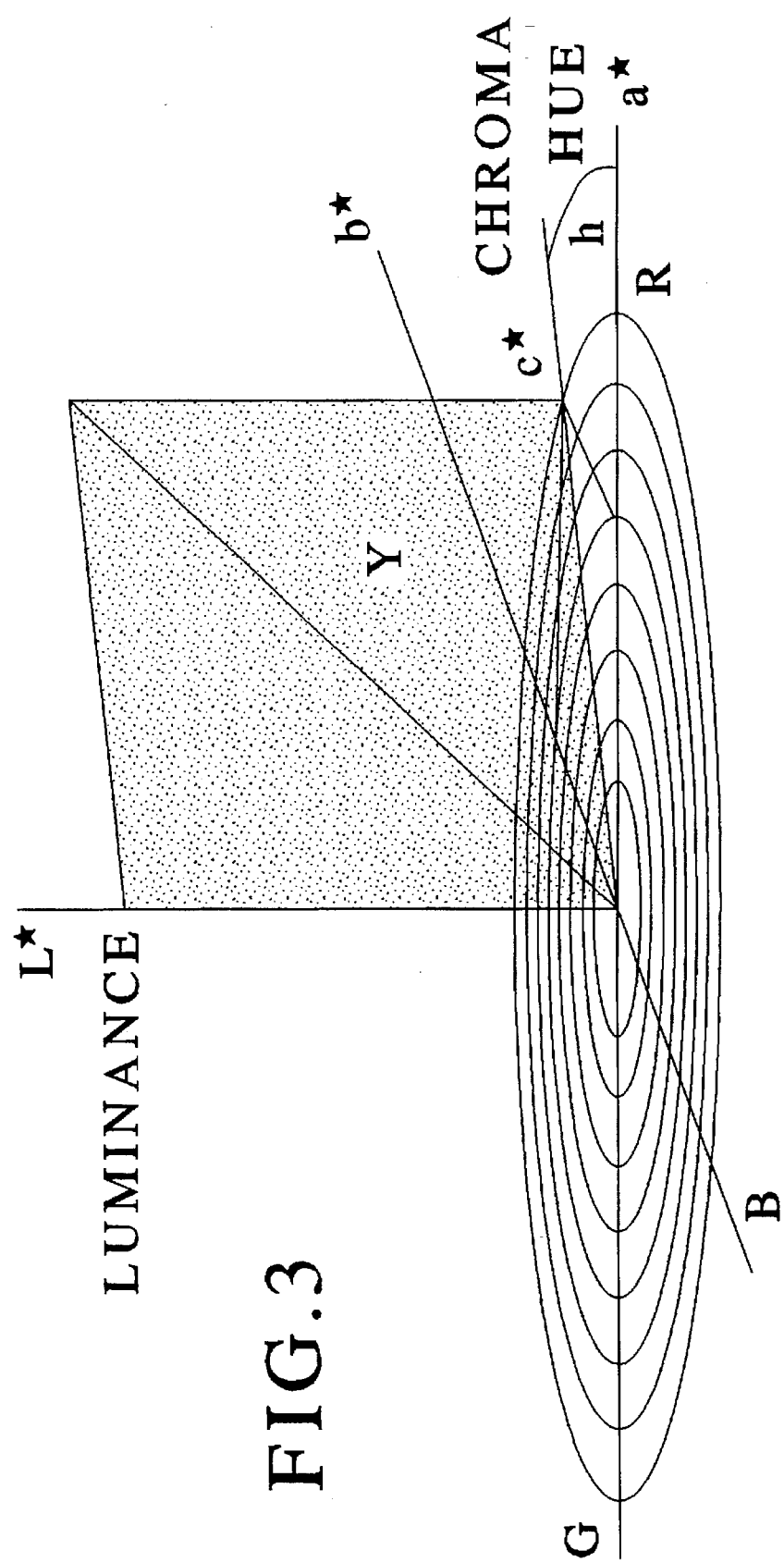
FIG. 3 illustrates the CIELAB color space.

FIG. 3 illustrates the CIE 1976 L*a*b* color space, referred to in short as CIELAB color space, that is equidistantly constructed in approximate conformity with sensation. The certain coordinates of the CIELAB color space are allocated to the sensory quantities of luminance L*, red-green chrominance a* (R–G) and yellow-blue chrominance b* (Y–B). The value range of the luminance L* extends from 100 for reference white through 0 for the absolute black. The value range of the chrominances a* and b* for colors proceeding from an illuminated subject (non-self-luminesce perceived colors (extends from approximately −80 through approximately +120.) The reference white and the absolute black have the chrominance of 0. The derived quantities (overall) chrominance c* (chroma) and color shade angle h (hue) can be calculated from the chrominances a* and b*. The value range of the chrominance c* lies between 0 (neutral or gray) and approximately +120. The color shade angle h lies between 0 and 360 degrees with reference to the positive a*-axis.

The present method of master analysis with respect to image scope, image gradation and color cast on the basis of the image values L*, a* and b* is set forth below.

In the present method for the analysis of the image scope of image originals, the frequency distribution of the luminance component L* (luminance histogram) of the transformed image values L*, a* and b* in the image original is identified. Subsequently, the light image value (brightest relevant luminance value) of the image original and the dark image value (darkest relevant luminance value) of the image original are calculated from the frequency distribution by defining the maximum and minimum luminance value L* depending on the curve of the frequency distribution in the light image and dark image region.

The method for analyzing the image scope (density range) in image originals (black-and-white originals and color originals) shall be set forth in greater detail below.

In a first method step, the frequency distribution of the luminance values L of the image values of the image original to be analyzed is identified as a luminance histogram H(L).

Figure 4:
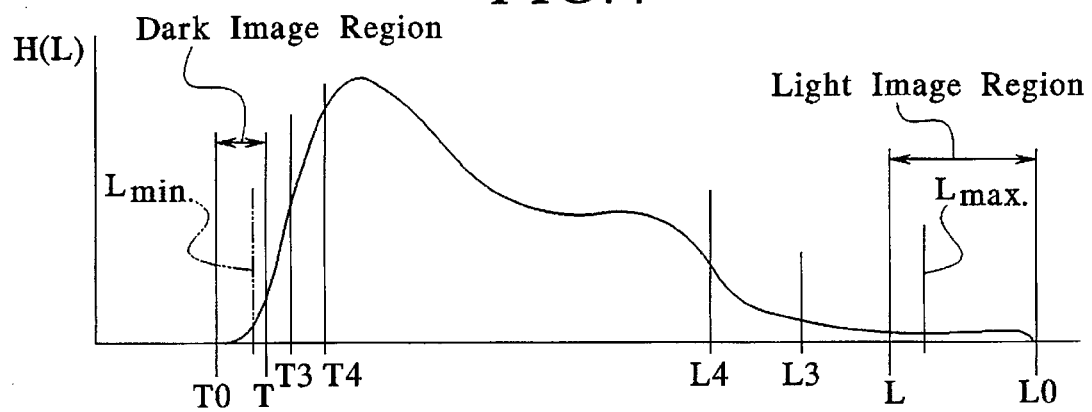
FIG. 4 illustrates a luminance histogram in connection with a method for analyzing density range for image scope.

FIG. 4 shows such a luminance histogram H(L). The luminance histogram is a data field H(L) whose size corresponds to the plurality of luminance steps (quantization steps) of the image values. The luminance value L is the index for the histogram data field H(L). The content of a component of the histogram H(L) corresponds to the plurality of luminance values L in the image values having the luminance value L.

For identifying the light image value Lmax as lightest relevant image value of the image original and of the dark image value Lmin as the darkest relevant image value of the image original, a light image region is first defined in a second method step as a possible luminance region for the light image value Lmax and a dark image region is initially defined therein as a possible luminance region for the dark image value Lmin in the luminance histogram H(L).

The determination of the boundaries of the light image region and of the dark image region advantageously occurs with the assistance of characteristic luminance values that are calculated from the luminance histogram H(L) and are referred to below as check points L or, respectively, T. As statistical parameters, the check points L and T are the "quantile" for prescribed frequency thresholds.

Two check points L0 and L that determine the possible luminance range for the light image value Lmax are derived from the curve of the luminance histogram H(L) for defining the boundaries of the light image region. The maximum luminance value for the light image value Lmax is defined by an upper check point L0. Image values greater than the check point L0 do not contain any relevant image information (for example, extreme highlight regions) and can thereby be limited in an adaptation of density range. The minimum luminance value for the light image value Lmax is defined by a lower check point L. Image values lower than the check point L belong to relevant image information and dare not be limited in adaptation of density range. The visually correct light image value Lmax lies between the lower and the upper check point L and L0 in the luminance range.

Likewise, two check points T0 and T that define the possible luminance range for the dark image value Lmin are derived from the path of the luminance histogram H(L) for defining the limits of the dark image region. The minimum luminance value for the dark image value Lmin is defined by a lower check point T0. Image values lower than the check point T0 contain no relevant image information and can therefore be limited in an adaptation of the density range. The maximum luminance value for the dark image value Lmin is defined by an upper check point T. Image values greater than the check point T belong to relevant image information and dare not be limited in an adaptation of the density range. The visually correct dark image value Lmin lies in the luminance range between the lower and the upper check point T0 and T.

FIG. 4 shows the definition of the light image region for the light image value Lmax by the check points L and L0 and the definition of the dark image region for the dark image value Lmin with corresponding check points T and T0.

The check points L and L0 for defining the light image region and the check points T and T0 for defining the dark image region are prescribed or, on the other hand, are advantageously derived from the luminance histogram H(L) of the image original to be analyzed.

For deriving the check points L and L0 or, respectively, T and T0 from the luminance histogram H(L), frequency thresholds for the individual check points are first determined.

For example, the upper check point L0 for the light image region is determined by a frequency threshold such that no relevant image values are limited. The lower check point L is defined by a corresponding frequency threshold such that a limitation of relevant image values becomes just visually perceptible. Greater frequency thresholds can be prescribed for the dark image region than for the light image region.

For deriving the check points L and L0, the frequency values H of the luminance histogram H(L) are added up (accumulated) proceeding from the maximum luminance value and are compared to the frequency thresholds prescribed for the light image region. For deriving the check points T and T0, the frequency values H of the luminance histogram H(L) are added up (accumulated) proceeding from the minimum luminance value and are compared to the frequency thresholds prescribed for the dark image region.

The check points L and L0 or, respectively T and T0 correspond to those luminance values at which the accumulated luminance H exceeds the prescribed luminance thresholds.

The luminance histogram H(L) is defined from discrete luminance values (for example, 8-bit quantization) and the accumulation of the frequency values H yields only discrete frequency values. In order to be able to exactly identify the check points L and L0 or, respectively T and T0 for the prescribed frequency thresholds, the luminance values of the check points must be calculated by interpolation from the discrete frequency values H.

After the definition of the light image region and of the dark image region with the assistance of the check points L and L0 or, respectively T and T0, the light image value Lmax is calculated from the path of the luminance histogram H (L) in the light image region in a third method step and the dark image value Lmin is calculated from the path of the luminance histogram H(L) in the dark image region in said third method step.

In a preferred way, the path of the luminance histogram H(L) in the light image region can be described by a global shape factor $cL_f$ and can be described in the dark image region by a global shape factor $cT_f$.

First, the global shape factors $cL_f$ and $cT_f$ are calculated in a step from the luminance histogram H(L) with the assistance of check points L.

For calculating the global shape factor $cL_f$ for the light image region, the existing check point L0 and two further check points L3 and L4 in the luminance histogram H(L) are utilized, their position being selected outside the light image region in the region of the image information.

For calculating the global shape factor $cT_f$ for the dark image region, the existing check point T0 and two further check points T3 and T4 in the luminance histogram H(L) are utilized whose position is selected outside the dark image region, likewise in the region of the image information.

FIG. 4 shows these additional check points L3 and L4 for the light image region or, respectively T3 and T4 for the dark image region.

For determining the further check points L3 and L4 or, respectively T3 and T4, frequency thresholds are again prescribed and are compared to the added (accumulated) frequency values H of the luminance histogram H(L). Those luminance values at which the prescribed frequency thresholds are exceeded are thereby identified.

The global shape factor $cL_f$ that describes the histogram curve H(L) in the light image region is calculated from the luminance values of the check points L0, L3 and L4 and is a measure for the relative position of the check points relative to one another.

$$cL_f = (L3-L4)/(L0-L4) \text{ (light image region)}$$

with L4<L3<L0

$cL_f$ has a value at 1 when check point L3 lies close to L0.

$cL_f$ has a value at 0 when check point L3 lies close to L4.

The global shape factor $cT_f$ that describes the histogram curve H(L) in the dark image region is calculated from the luminance values of the check points T0, T3 and T4 and is likewise a measure for the relative position of the check points relative to one another.

$$cT_f = (T4-T3)/(T4-T0) \text{ (dark image region)}$$

with T0<T3<T4.

Over and above this, the value of the global shape factors $cL_f$ and $cT_4$ allows a rough classification of the histogram curves of the image originals to be analyzed.

For example, four typical histogram curves H(L) for the light image region can be classified from the value of the global shape factor $cL_f$, this being shown in FIG. 5.

FIG. 5 shows the classification of the histogram curves H(L) of various image originals in, for example, four histogram types, and shows the respective determination of the light image value Lmax in the light image regions.

Histogram Type 1

Image original: Normal image original with short "highlight" spur proceeding a steeper rise to the medium tint Global shape factor: $cL_f < 0.5$

Histogram Type 2

Image original: Dark image original having a larger light image region (frequency peek)

Global shape factor: $cL_f > 0.5$

Histogram Type 3a

Image original: Extremely light image original having large light image regions without pronounced "highlight" spurs Global shape factor: $cL_f \approx 0.5$

Histogram Type 3b

Image original: Extremely dark image original having a long spur to the region of light image Global shape factor: $cL_f \approx 0.5$ Despite different histogram curves H(L), the histogram types 3a and 3b shown in FIG. 5 have identical global shape factors $cL_f$ for the light image regions because only the relative position of the check points L enters into the calculation of the global shape factors $cL_f$. The two different histogram curves H(L) can therefore be only imprecisely classified by the global shape factors $cL_f$.

It therefore proves advantageous to correct the global shape factor $cL_f$ for the light image region and the global shape factor $cT_f$ for the dark image region of the different histogram types taking the absolute spacings of the respective check points L0, L3 and L4, or respectively T0, T3 and T4, into consideration.

For considering the respective absolute spacings of the check points L0, L3 and L4 for the light image region, a correction value $cL_k$ is therefore first calculated for the global shape factor $cL_f$ as follows:

$$cL_k = (L0+L4)/(L3+L4) \text{ (light image region)}$$

The corrected global shape factor $cL_g$ for the light image region then derives by multiplying the global shape factor $cL_f$ by the correction value $cL_k$:

$$cL_g = cL_f * cL_k \text{ (light image region)}$$

Analogously, the correction value $cT_k$ and the corrected global shape factor $cT_g$ for the dark image region derive as:

$$cT_k = (T4+T3)/(T4+T0) \text{ (dark image region)}$$

$$cT_g = cT_f * cT_k \text{ (dark image region)}$$

The employment of the corrected global shape factors $cL_g$ and $cT_g$ instead of the global shape factors $cL_f$ and $cT_f$ enables a significantly more precise classification of the histogram curves H(L) of the image originals to be analyzed, this being set forth with reference to the two histogram types 3a and 3b.

Given histogram type 3a, the check points L0, L3 and L4—as may be seen from FIG. 5—lie close to one another. The correction factor $cL_k$ is $\approx 1.0$ and corrected global shape factor $cL_g \approx 0.5$.

Given histogram type 3b, the check points L0, L3 and L4—as may likewise be seen from FIG. 5—lie far apart. In this case, the correction factor is $cL_k >> 1.0$ and the corrected global shape factor is $cL_g >> 0.5$. It may be derived therefrom that the two histogram types 3a and 3b can be discriminated, or respectively classified, with the assistance of the corrected global shape factors $cL_g$.

After the determination of the global shape factors, the calculation of the light image value Lmax in the light image region and of the dark image value Lmin in the dark image region occurs in a further step.

It proves advantageous to undertake the calculation of the light image value Lmax and of the dark image value Lmin depending on the corrected global shape factors $cL_g$ and $cT_g$.

The calculation of the light image value Lmax occurs by weighing the end points of the light image region L0 and L with the corrected global shape factor $cL_g$:

$$\text{Lmax} = (1 - cL_g)*L + cL_g*L0 \text{ (light image region)}$$
$$= L + cL_g*(L0 - L)$$

The light image value Lmax lies between the check points L and L0 shifted more toward L or toward L0 depending on the value of the corrected global shape factor $cL_g$. The light image value Lmax is thereby determined in linear dependency on the corrected global shape factor $cL_g$.

The calculation of the dark image value Lmin correspondingly occurs by weighing the end points of the dark image region T0 and T with the corrected global shape factor $cT_g$:

$$\text{Lmin} = (1 - cT_g)*T + cT_g*T0 \text{ (dark image region)}$$
$$= T + cT_g*(T0 - T)$$

For example, the determination of the light image value Lmax in the different histogram types occurs by the definition thereof dependent on the corrected global shape factor $cL_g$ in the desired way.

The unambiguous classification of the histogram types 3a and 3b on the basis of corrected global shape factors and the analysis result on the basis of the definition of the light image value Lmax dependent on the corrected global shape factor $cL_g$ proceeds from the following compilation of the different histogram types.

Histogram Type 1

Image original: Normal image original with short "highlight" spur proceeding a steeper rise toward the medium tint Global shape factor: $cL_f < 0.5$ Correction value: $CL_k \geq 1.0$ Corrected global shape factor: $CL_g < 0.5$ Result: The short "highlight" spur can be more greatly limited. Light image value defined more in the direction L:L→Lmax—L0

Histogram Type 2

Image original: Dark image original having a larger light image region (frequency peak)

Global shape factor: $cL_f > 0.5$

Correction value: $cL_k \geq 1.0$

Corrected global shape factor: $cL_g > 0.5$

Result: The light image regions date not be limited to an excessive degree. Determine light image value more in the direction I): L—Lmax→L0

Histogram Type 3a

Image original: Extremely light image original having large, light image regions without pronounced "highlight" spurs Global shape factor: $cL_f \approx 0.5$ Correction value: $cL_k \approx 1.0$ Corrected global shape factor: $cL_g \approx 0.5$ Result: The light image regions dare not be limited to an excessive degree. Define light image value more in the direction L0: L—Lmax→L0

Histogram Type 3b

Image original: Extremely dark image original having a long spur toward the region of light image Global shape factor: $cL_f \approx 0.5$ Correction value: $cL_k \gg 1.0$ Corrected global shape factor: $cL_g \gg 0.5$ Result: The light image regions of low frequency dare not be limited to an excessive extent (the lower check point L given this type of original unusually already lies in the light medium tint). Define light image value more in the direction L0: L—Lmax→L0.

An advantageous modification of the method step for the definition of the light image value Lmax and of the dark image value Lmin shall be set forth below.

Given the above-described method step for determining the light image value Lmax and the dark image value Lmin, the light value Lmax and the dark image value Lmin were determined between the lower and the upper check points L and L0 or, respectively T0 and T, in linear dependency on the corrected global shape factors $cL_g$, or respectively $cT_g$:

$$Lmax = L + cL_g*(L0-L) \text{ (light image region)}$$

$$Lmin = T + cT_g*(T0-T) \text{ (dark image region)}$$

Figure 6A:
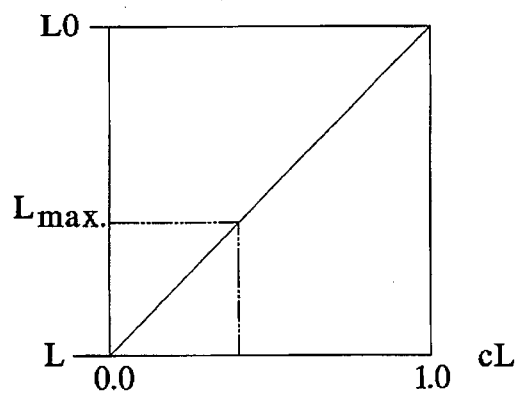
FIG. 6a shows a graphic illustration for determining a light image value $L_{max}$ in connection with the method for analysis of image scope.

FIG. 6a shows a graphic illustration directed thereto for determining the light image value Lmax for the light image region between the check points L0 and L with linear dependency on the corrected global shape factor $cL_g$.

It proves advantageous to calculate the light image value Lmax and the dark image value Lmin in a non-linear (for example, quadratic) dependency on the corrected global shape factors $cL_g$, or respectively $cT_g$, between the lower and the upper check points L0 and L, or respectively T and T0, in the following way:

$$Lmax = L + (cL_g + f(cL_g^2))*(L0-L) \text{ (light image region)}$$

$$Lmin = L + (cT_g + f(cT_g^2))*(T0-T) \text{ (dark image region)}$$

Figure 6B:
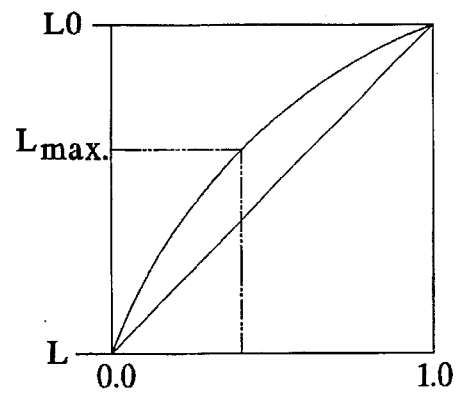
FIG. 6b shows a light image value $L_{max}$ for the light image region in connection with the method for analysis of the image scope.

FIG. 6b shows the determination directed thereto of the light image value Lmax for the light image region between L0 and L with non-linear dependency on the corrected global shape factor $cL_g$.

Due to the non-linear dependency, for example, histogram curves having extremely small shape factors ("highlight" spurs) are more highly limited than histogram curves H(L) having a greater shape factor (FIG. 5).

This effect is advantageously achieved in that the definition of the lower check point L of the light image region and of the upper check point T of the dark image region respectively occurs dependent on the local histogram curve H(L).

Figure 7:
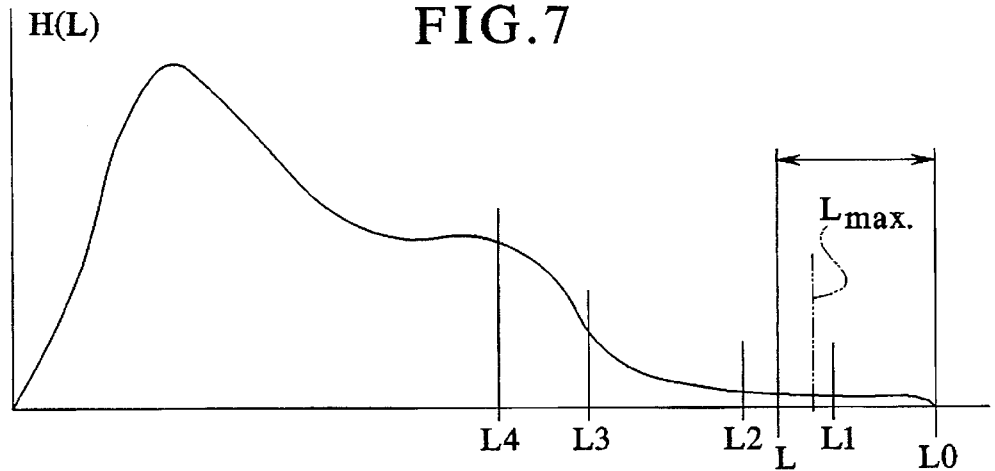
FIG. 7 shows a histogram curve in connection with a method for analysis of the image scope.
Figure 5A:
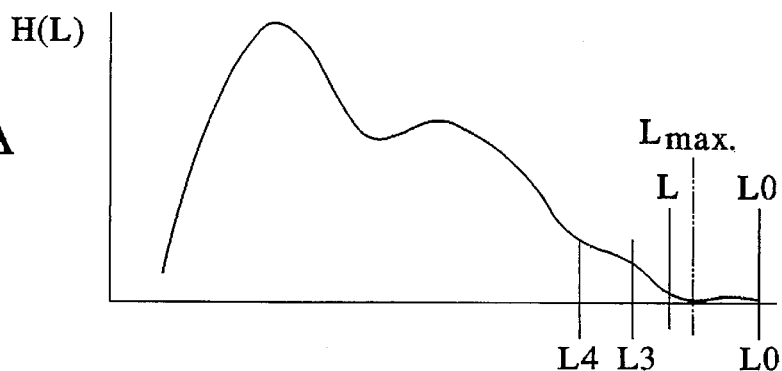
FIG. 5 shows histogram curves for the light image region in connection with the method for analysis of image scope.
Figure 5B:
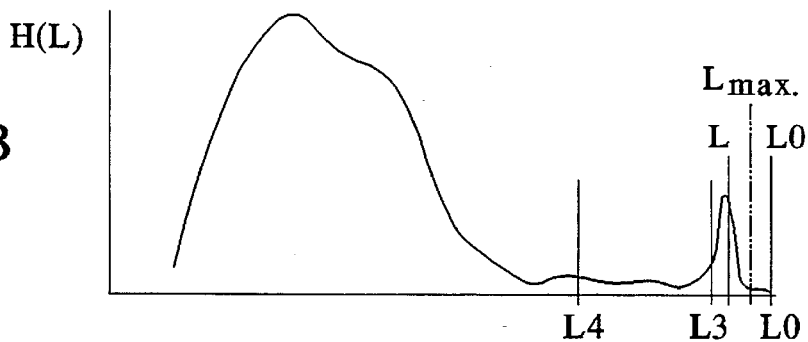
Figure 5C:
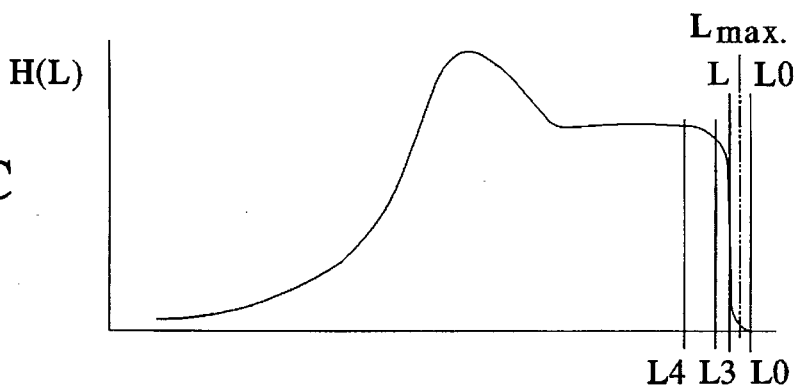
Figure 5D:
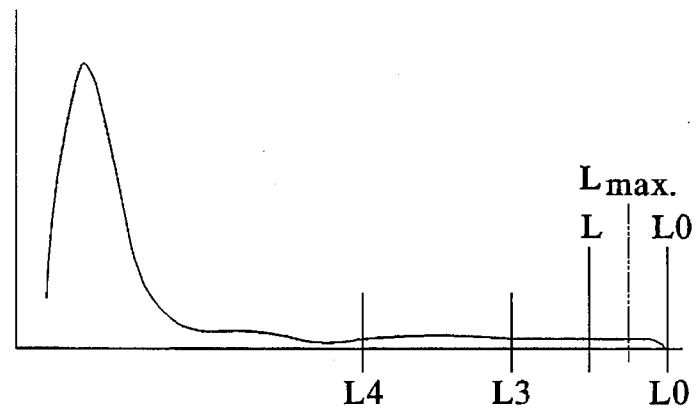

For that purpose, two further local check points L1 and L2 are calculated in the histogram curve H(L) for the light image region by prescribing frequency threshold values, and the lower check point L is determined between L1 and L2 dependent on the corrected global shape factor $cL_g$, as may be seen from FIG. 7.

Likewise, two further local check points T1 and T2 are determined in the histogram curve H(L) for the dark image region by prescribing frequency threshold values, and the upper check point T is determined between T1 and T2 dependent on the corrected global shape factor $cT_g$.

The frequency thresholds for the check points L1 and L2, or respectively T1 and T2, are preferably selected lower than the frequency thresholds for the check points L3 and L4, or respectively T3 and T4.

The modified method then sequences in the following method steps.

Determination of the frequency distribution of the luminance values L of the image values of an image original to be analyzed as a luminance histogram H(L).

Calculation of the local check points L0, L1 and L2 for the light image region by prescribing (lower) frequency thresholds NSwL0, NSwL1 and NSwL2.

Determining the local check points T0, T1 and T2 for the dark image region by prescribing (lower) frequency thresholds NSwT0, NSwT1 and NSwT2.

Determining the global check points L3 and L4 for the light image regions by prescribing (higher) frequency thresholds NSwL3 and NSwL4.

Determining the global check points T3 and T4 by prescribing (higher) frequency thresholds NSwT3 and NSwT4.

Calculating the corrected global shape factors $cL_g$ and $cT_g$ from the check points L0, L3 and L4 or, respectively, T0, T3 and T4.

Global shape factors $cL_f$ and $cT_f$:

$$cL_f = (L3-L4)/(L0-L4) \text{ (light image region)}$$

$$cT_f = (T4-T3)/(T4-T0) \text{ (dark image region)}$$

correction values $cL_k$ and $cT_k$:

$$cL_k = (L0+L4)/(L3+L4) \text{ (light image region)}$$

$$cT_k = (T4+T3)/(T4+T0) \text{ (dark image region)}$$

corrected global shape factors $cL_g$ and $cT_g$:

$$cL_g = cL_f * cL_k \text{ (light image region)}$$

$cT_g = cT_j * cT_k$ (dark image region)

determination of the value range (light image region) for the light image value Lmax between the upper check point L0 and the lower check point L.

The lower check point L is calculated between the local check points L1 and L2 dependent on the global shape factor $cL_g$:

$$L = (1-cL_g)*L2 + cL_g*L1 \quad (1)$$

Determining the light image value Lmax between the lower check point L and the upper check point L0 dependent on the corrected global shape factor $cL_g$.

$$Lmax = (1-cL_g)*L + cL_g*L0 \quad (2)$$

Determination of the value range (dark image region) for the dark image value Lmin between the lower check point T0 and the upper check point T.

The upper check point T is calculated between the local check points T1 and T2 dependent on the global shape factor $cT_g$.

$$T = (1-cT_g)*T2 + cT_g*T1 \quad (3)$$

Determining the dark image value Lmin between the lower check point T0 and the upper check point T dependent on the global shape factor $cT_g$.

$$Lmin = (1-cT_g)*T + cT_g*T0 \quad (4)$$

By introducing equation (1) into (2) or, respectively, (3) into (4), the desired, non-linear dependency derives for the determination of the light image value Lmax in the light image region and of the dark image value Lmin from the global shape factors $cL_g$ and $CT_g$.

The light image values Lmax and dark image values Lmin calculated in this way are subsequently converted into setting values for the image input apparatus.

In the method for the analysis of the image gradation, the image original to be analyzed first is geometrically subdivided into a plurality of sub-images, e.g., with a matrix of sub-images. The frequency distribution of the luminance or luminosity component L* of the image values L*, a* and b* in the corresponding sub-image is separately calculated for every sub-image as a sub-image histogram. Subsequently, the sub-image histograms of the individual sub-images are evaluated and the sub-images critical to the image for the image gradation are identified with reference to the evaluation. An aggregate histogram is then calculated from the sub-image histograms of the image-critical sub-images, this aggregate histogram corresponding to the frequency distribution of the luminance component L* of the image values L*, a* and b* in the image-critical sub-images. Subsequently, a correction curve G=f(L) for the correction of the image gradation characteristic of the image original for the purpose of contrast correction is then calculated from the aggregate histogram according to a histogram modification method.

The method for the analysis of the image gradation will now be described in detail.

Method Step [A]

For identifying the frequency distribution of the luminance values from the image-critical regions of the original for analysis of image gradation, the image original to be analyzed is geometrically divided into sub-images in a first method step [A], for example into a sub-image matrix of 16×16 sub-images.

Method Step [B]

In a second method step [B], a frequency distribution sub-image histogram of the image values of a black-and-white original or, respectively, the frequency distribution of the luminance component L* of the color values L*, a*, b* of a color original is calculated for every sub-image.

Method Step [C]

In a third method step [C], the sub-image histograms of the individual sub-images are statistically evaluated and the sub-images that are image-critical for the image gradation of the image original are then classified on the basis of the respective results of the evaluation.

Evaluation of the Sub-Image Histograms Step [C]

The identification of the sub-images critical to the image and not critical to the image takes place, for example, with the assistance of the statistical histogram parameter SDev "scatter" or, respectively, "standard deviation" and of the histogram parameter FiAnt "relative area proportion of the most frequent image values", referred to in short as histogram parameter FiAnt "rel. area proportion." However, other histogram parameters can also be utilized.

The histogram parameter SDev "scatter" is a measure for the average mean deviation of the image values from the mean of the histogram distribution. Sub-images having a low scatter or standard deviation probably contain less structure and thus are not critical to the image. Sub-images having a high value of scatter or standard deviation probably contain a great deal of structure and thus are critical to the image.

A later classification into image-critical and image-noncritical regions ensues, via a definable thresholding of the histogram parameter SDev "scatter" with a threshold value SwSDev. When the value of the histogram parameter SDev "scatter" of a sub-image is lower than the prescribed threshold SwSDev, then the sub-image is classified as being low in structure.

A conclusion regarding a great deal of structure in the sub-image cannot be unambiguously derived from a high value of the histogram parameter SDev "scatter". This is true, given images with large-area image regions of different luminance that are low in structure (for example, bimodal histogram distributions). The histogram parameter FLAnt "rel. area proportion" then is utilized for recognizing initialization in this type of image.

The histogram parameter FLAnt "rel. area proportion" serves as a measure of the "planarity" of the image original, i.e. for the proportion of low-structure image regions in the sub-image. The histogram parameter FLAnt "rel. area proportion" indicates the relative proportion of the most frequent image values with reference to the total number of image values in a sub-image. Sub-images having a high value of the histogram parameter FLAnt "rel. area proportion" probably contain little structure and thus are not considered critical to the image. Sub-images having a low value of the histogram parameter FLAnt "rel. area proportion" probably contain a great deal of structure and thus are critical to the image.

The later classification into image-critical and image-noncritical regions with the assistance of the histogram parameter FLAnt "rel. area proportion" likewise ensues via a definable thresholding step utilizing a threshold value SwFLAnt. When the histogram parameter FLAnt "rel. area proportion" of a sub-image is higher than the prescribed threshold SwFLAnt, then the sub-image is classified as low-structure.

For the later sub-image classification, the threshold SwSDev of the histogram parameter SDev "scatter" and the threshold SwFLAnt of the histogram parameter FLAnt "rel. area proportion" are first defined. The thresholds determine the division into the two parameter classes. Given image originals having much structure, i.e. when a great number of sub-images contains structure, a higher threshold can be selected higher. Given image originals having less structure, i.e. when a small number of sub-images contains structure, a lower threshold can be selected.

For evaluating the sub-image histograms, the histogram parameter SDev "scatter" and the histogram parameter FLAnt "rel. area proportion" are calculated for every sub-image according to calculating methods for statistical evaluation of histograms.

The histogram parameter SDev "scatter" is calculated in the following way:

A sub-image composed of a sequence of image values $x_1, \ldots x_N$. N references the total plurality of image values in the value range of the image values $x_i: 1, \ldots M$. $H(i)$ is the plurality of image values having the value i in a sub-image.

The plurality of image values N is first calculated:

$$N = \sum_{i=1}^{N} H(i)$$

For the calculation of the histogram parameters SDev "scatter", the mean value of the frequency distribution is then first calculated, whereby the mean value of a frequency distribution is that image value around which the other image values of the distribution group. The mean value is generated by the following:

$$\text{Mean} = \frac{1}{N-1} \sum_{i=1}^{N} i^*H(i)$$

Subsequently, the variance Var is defined:

$$Var = \frac{1}{N-1} \sum_{i=1}^{N} (i - \text{Mean})^{2*}H(i)$$

The histogram parameter SDev "scatter" derives therefrom as:

$$SDev = \sqrt{Var}$$

The standard deviation or, respectively, variance is a measure for the average or mean deviation of the image values from the mean of the distribution. When the standard deviation is low, then the image values lie close to the mean on average (narrow frequency distribution). When the standard deviation is high, then greater deviations of the image values from the mean will be more frequent (broad frequency distribution).

The histogram parameter FLAnt "rel. area proportion" is calculated in the following way:

For calculating the histogram parameter FLAnt "rel. area proportion", the histogram values H(i) are first sorted in the descending sequence of the frequency>$H_s(i)$. By prescribing the plurality n of histogram values $H_s(i)$ to be accumulated, the histogram parameter FLAnt is calculated as:

$$FlAnt(S) = \sum_{i=1}^{n} H_s(i)/N$$

The histogram parameter FLAnt indicates the relative proportion S of the most frequent image values with reference to the total number of image values and is a measure for the "planarity" or "flatness" of the original, i.e. for the proportion of low-structure image regions in the original.

After the calculation of the histogram parameter SDev "scatter" and FLAnt "rel. area proportion", the thresholds SwSDev and SwFLAnt are defined, as set forth below.

It has proven advantageous to define the threshold SwSDev and/or the threshold SwFLAnt depending on the original in order to obtain an adequate plurality f image-critical sub-images for calculating the luminance histograms.

The following process can be implemented for defining the threshold SwSDev for the histogram parameter SDev "scatter."

For image-dependent definition of the threshold SwSDev, the frequency distribution of the values of the histogram parameter SDev "scatter" of the individual sub-images is utilized.

For that purpose, FIG. 8 illustrates a frequency distribution of the histogram parameter SDev "scatter" for image originals having little structure (left) and for image originals having much structure (right). Differently defined thresholds S respectively separate the frequency distributions into two parts that can be interpreted as being separate frequency distributions.

The "informational content" (entropy) is respectively calculated for separate frequency distributions, whereby the threshold S is shifted across the possible value range. The entropy function $\Phi(S)$ is defined as the sum of the entropies of the two individual, separate frequency distributions dependent on the threshold S shifted over the possible value range.

For that purpose, FIG. 9 illustrates a typical course of an entropy function $\Phi(S)$. For example that value S at which the entropy function $\Phi(S)$ has a maximum value or at which the entropy function $\Phi(S)$ achieves a percentage of the maximum value of, for example, 90% is then selected as the threshold SwSDev for the histogram parameter SDev "scatter."

The following may be said regarding the definition of the threshold SwFLAnt for the histogram parameter FLAnt "rel. area proportion":

For example, a fixed value can be prescribed for the threshold SwFLAnt of the histogram parameter FLAnt "rel. area proportion." However, the plurality of the most frequency image values to be accumulated is identified depending on the image scope (minimum/maximum value of luminance) in the calculation of the histogram parameter FLAnt.

After the calculation of the histogram parameter SDev and FLAnt for all sub-areas, the histogram parameters SDev and FLAnt are recalled in and compared to the corresponding thresholds SwSDev and SwFLAnt for the classification of image-critical (structure-righ) and image-uncritical (structure-poor) sub-images.

Sub-Image Classification Step [C2]

The classification of the sub-images can proceed according to the following classification pattern:

| Parameter | Parameter "Scatter" | |
|---|---|---|
| "Rel. area proportion" | SDev < SwSDev | SDev > SwSDev |
| FLAnt > SwFLAnt | Sub-image Without Structure | Sub-image Without Structure |
| FLAnt < SwFLAnt | Sub-image Without Structure | Sub-image With Structure |

Denoted in this classification pattern are:

Sdev=histogram parameter "scatter"

FLAnt=histogram parameter "rel. area proportion"

SwSDev=threshold for histogram parameter "scatter"

SwFLAnt=threshold for histogram parameter "rel. area proportion."

A sub-image that only contains structure is thus classified as image-critical when the value of the histogram parameter SDev "scatter" is higher than the prescribed threshold SwSDev and the value of the histogram parameter FLAnt is lower than the prescribed threshold SwFLAnt.

The sub-image histograms of those sub-images that were classified as structure-rich according to the above classification pattern are utilized for the calculation of the aggregate histogram according to Method Step [D], and this is set forth below.

Method Step [D]

In a fourth method step [D], an aggregate histogram that corresponds to the frequency distribution of the image values or, respectively, of the luminance component in the image-critical sub-images is calculated from the sub-image histograms of the sub-images classified as image-critical. For that purpose, the functionally corresponding frequency values for every luminance stage L* are added together in the individual sub-image histograms of the image-relevant sub-images and the summed-up frequency values are defined as a new frequency distribution over the corresponding luminance values L* as aggregate histogram.

Figure 10B:
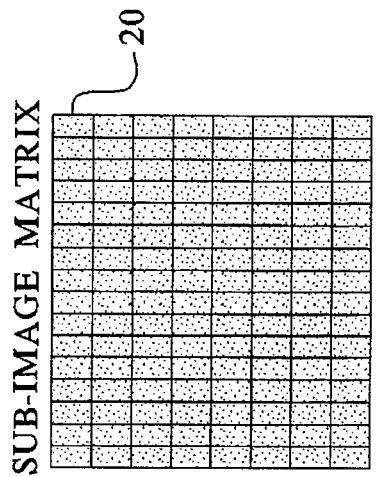
FIG. 10b and 10d shows an example of a classification of image-critical sub-images in connection with the method for the analysis of the image gradation.
Figure 10D:
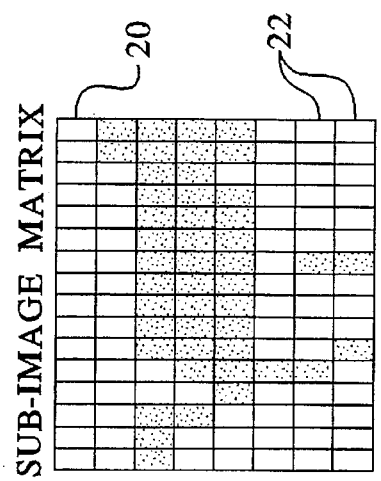
Figure 10A:
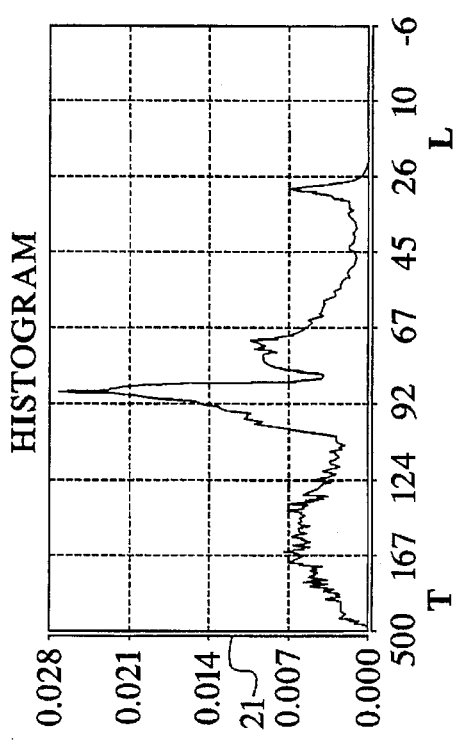
FIG. 10a and 10c illustrates a trend of a prior art luminance histogram without classification of image-critical sub-images in connection with the method for analysis of image gradation.
Figure 10C:
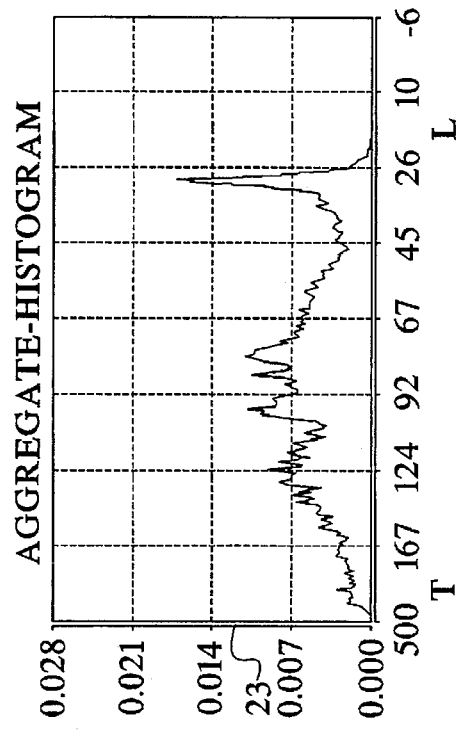
Figure 11A:
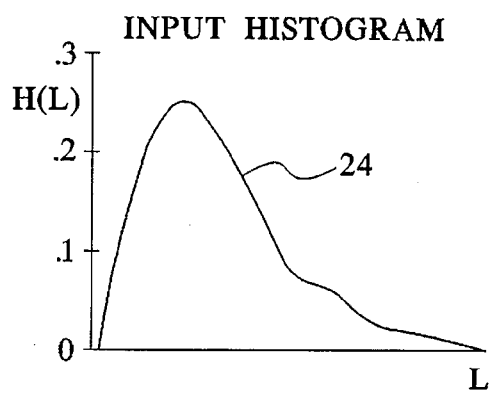
FIG. 11 illustrates the principle of the method of histogram equalization in connection with the method for the analysis of the image gradation.
Figure 11B:
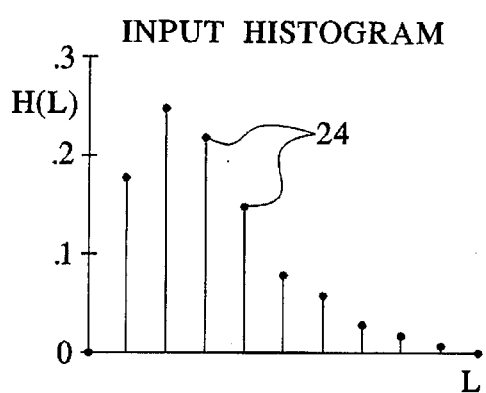
Figure 11C:
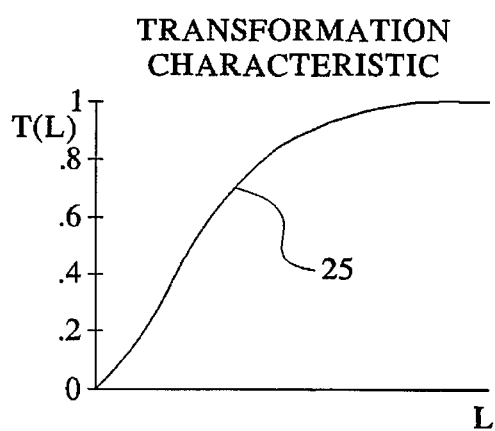
Figure 11D:
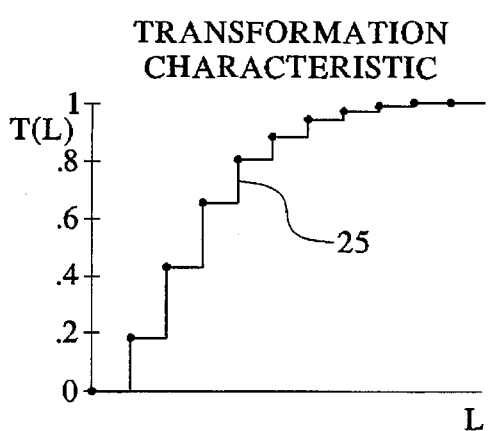
Figure 11E:
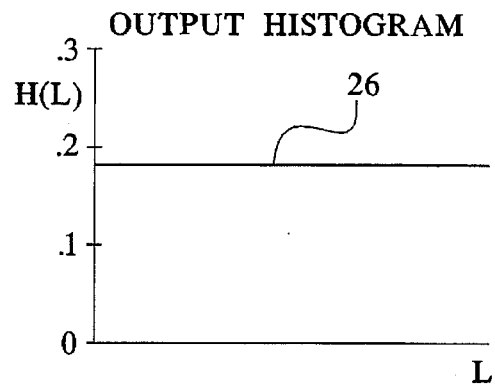
Figure 11F:
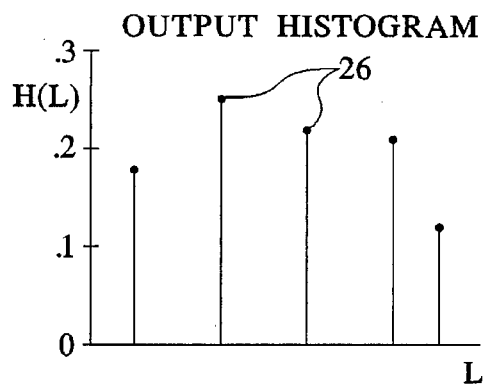

FIG. 10a illustrates the trend of a prior art luminance histogram without classification of image-critical sub-images. The right-hand portion of FIG. 10a juxtaposes an image original 20. According to the prior art, the entire image original is utilized for the formation of the resulting luminance histogram 21, this being shown in the left-hand portion of FIG. 10a.

FIG. 10b shows an example of a classification of image-critical sub-images and the trend of an aggregate histogram that results from the sub-image histograms of the image-critical sub-images.

The right-hand portion of FIG. 10b again shows an image original 20 that was subdivided into sub-images 22 according to method step [A]. According to method steps [B] and [C], sub-image histograms produced for the sub-images 22 and image-critical sub-images are identified by evaluating the sub-image histograms. Image-critical sub-images are marked in black by way of example in FIG. 10b.

The aggregate histogram 23 formed according to method step [D] is shown in the left-hand portion of FIG. 10b. This aggregate histogram reproduces the frequency distribution of the luminance values L* from the image-critical regions of the original. The aggregate histogram is employed for the calculation of a correction curve G=f(L) in method step [E] for the correction of the image gradation characteristic for the purpose of contrast correction.

Method Step [E]

In a fifth method step [E], a correction curve G=f(L) for a contrast correction is calculated from the aggregate histogram according to the histogram modification method.

The histogram modification method is set forth below in greater detail.

Histogram Modification Method

Methods of histogram modification are fundamentally well-suited for the automatic calculation of a correction curve for contrast correction, since a charactdristic curve for contrast correction matched to a specific image original can be independently calculated on the basis of a statistical image analysis and contrast sensation models or concepts.

In the histogram modification methods, the contrast changes are implemented based on the frequency distribution of the image values (histogram). The image values of an original image are resorted via a transformation such that the histogram of the processed image assumes a specific course.

A histogram modification method is set forth, for example, with reference to the example of a histogram equalization, this being implemented in the following steps:

In a first step, the frequency distribution of the image values is identified.

In a second step, a transformation characteristic that corresponds to the aggregate frequency of the frequency distribution is calculated by summing the histogram values.

In a third step, the image values are transformed via the transformation characteristic.

After the transformation of the image values with the gradation transformation characteristic, the histogram of the processed image exhibits a modified course or trend.

In the ideal case of extremely small gradation (quantization) of the image values (continuous image values), the histogram is exactly equally distributed. Given a courser quantization of the image values (discrete image values), an equal distribution of the image values can no longer be achieved by the redistribution of the image value steps but the frequency peaks are broadened and highly flattened.

FIG. 11 illustrates the principle of the method of histogram equalization with continuous image values (left-hand portion of FIG. 11) and with discrete image values (right-hand portion of FIG. 11). An input histogram 24, a transformation characteristic 25 and an output histogram 26 are respectively illustrated, the latter corresponding to the input histogram 24 modified according to the transformation characteristic.

The correction curve G=f(L) calculated according to the method of histogram equalization effects an intensification of contrast by spreading image value steps in the tonal value ranges of the frequent image values (steep characteristic curve) and effects a reduction in contrast by combining image value steps in the tonal value ranges of the less frequent image values (flat characteristic curve).

Following this explanation of the method of a histogram modification or, respectively, histogram equalization, reference is now made again to method step [E]. The determination of the correction curve G=f(L) according to method step [E] for correcting the image gradation characteristic occurs according to the above-described method of histogram modification by accumulation of the histogram values H(i) of the aggregate histogram in the range LMin through LMax according to the equation:

$$G(L) = \sum_{i=L\min}^{L} H(i)$$

The accumulation of the histogram values H(i) is thereby implemented only between the analyzed, minimum and maximum values of the luminance scope of the original (light image and dark image values).

FIG. 12 illustrates a graphic illustration of the determination of the correction curve G=f(L) 28 between dark image and light image from the aggregate histogram 27.

The smoothing of the correction curve G=f(L) ensues on the basis of a low-pass filtering according, for example, to the "sliding mean" method. According to this method, the values of the smoothed characteristic are calculated as the weighted sum of neighboring values of the unsmoothed characteristic. Due to the specific selection of the weighting factors, an optimum smoothing by a polynomial of the third order with minimum deviation in the quadratic mean is achieved in the averaging interval of, for example, 5 values. The weighting factors can be formed in the following way:

| -3/35 | 12/35 | 17/35 | 12/35 | -3/35 |
|---|---|---|---|---|

The course of the correction curve G=f(L) for the contrast correction is reproduced by a limited plurality of supporting values (for example, 16 supporting values). The selection of the supporting values from the values of the smoothed characteristics ensues optimally equdistantly in visual terms. The contrast correction determined from the luminance histogram is calculated into the color image values as, for example, a pure luminance correction via a change of the neutral gradation. Supporting values between the light image values and dark image values are identified for the correction curve G=f(L).

The actual contrast correction occurs in the image scanning devices 1, 2, 3, in that the calculated correction curve G=f(L) is forwarded to the image scanner device and the image gradation characteristic deposited thereat, for example, in table memories LUT, is corrected according to the correction curve G=f(L). The image values acquired by a fine scan in the image scanner device are then utilized for the conversion according to the corrected image gradation characteristic.

The employment of the correction curve G=f(L) usually leads to great contrast corrections in practice, these being frequently not desired.

Variable Contrast Correction

An advantageous development of the method is therefore comprised therein that the contrast correction is made variable with the assistance of a selectable correction factor k so that the degree of correction can be set via the correction factor k from a minimum (0%) through a maximum (100%).

A variable contrast correction is set forth below with reference to FIG. 13. First, a histogram gradation HG (30) is defined from the luminance histogram H (29) according to the method of histogram modification. The application of the histogram gradation HG (30) corresponds to the 100% degree of correction. Simultaneously, a linear gradation LG (31) is produced that corresponds to a 0% degree of correction.

The variable contrast correction for an image original occurs via a correction gradation KG (32) that is formed by addition of gradation parts of the histogram gradation HG (30) selectable via the correction factor k and the linear gradation LG (31) according to the following equation:

$$KG = k*HG + (1-k)*LG$$

Figure 13A:
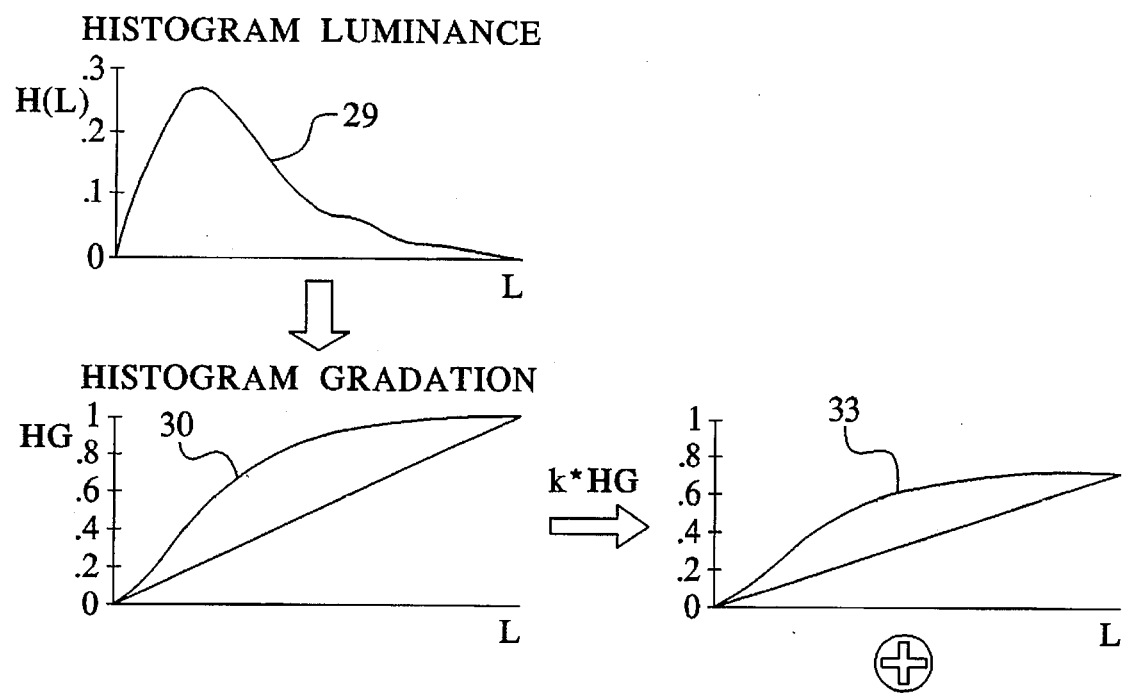
FIG. 13a illustrates a variable contrast correction in connection with the method for the analysis of the image gradation.
Figure 13B:
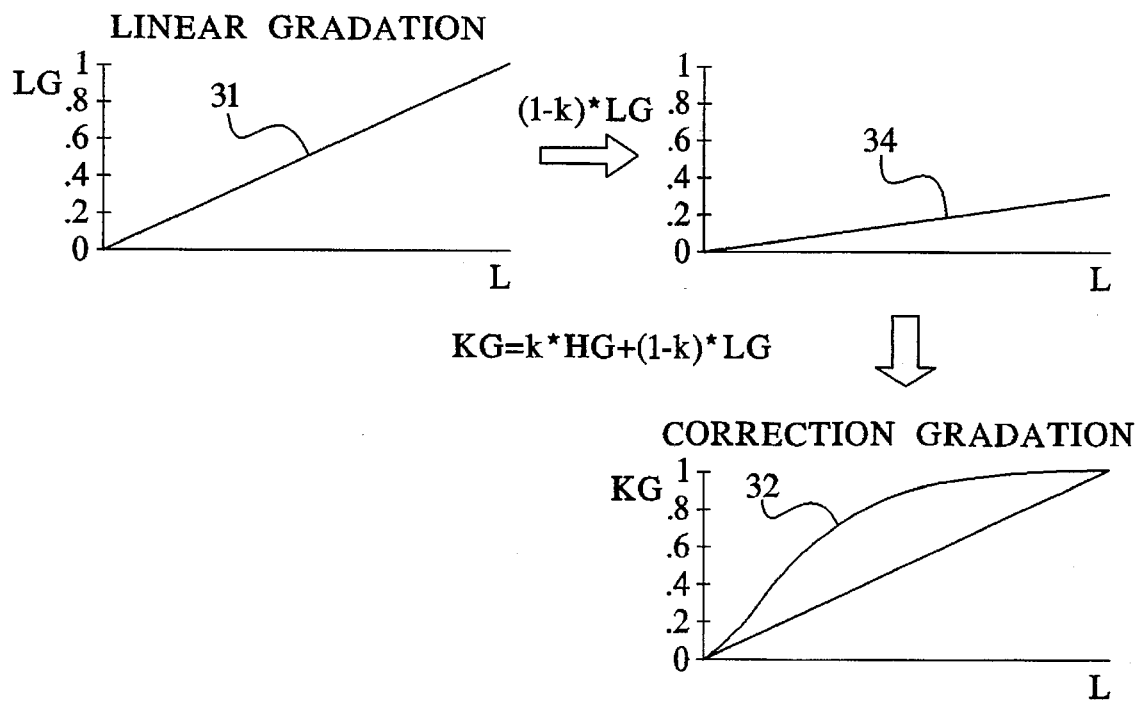
FIG. 13b illustrates selectable gradation parts in connection with the method for the analysis of the image gradation.

The selectable gradation parts k*HG (33) and (1-k) * LG (34) are likewise illustrated in FIG. 13.

The degree of correction is advantageously designed image-dependent such that the correction factor k is respectively defined depending on the properties of the image original.

The determination of an image-dependent correction factor k is based on the following principle:

The mean quadratic deviation of the calculated course of the correction curve G=f(L) (maximum contrast correction) from the linear course of the correction curve G f(L) (minimum contrast correction) is a measure for the "visual" strength of the contrast correction. The mean quadratic deviation (root means square), referenced RMS value, is determined from the visually equidistant luminance image values L*. A high RMS value corresponds to a great contrast correction; a low RMS value corresponds to a lower contrast correction.

The RMS value of the calculated course of the correction curve G=f(L), however, does not generally correspond to the visually necessary correction. The required degree of the contrast correction is generally dependent on the course of the frequency distribution of the luminance values. Image originals having highly one-sided histogram curves (too light/dark) usually require a more pronounced correction. Image originals having more balanced histogram curves usually require less of a correction or no correction.

Whether a histogram distribution is more balanced or highly one-sided can be advantageously derived from the statistical histogram parameters "skewness" and "Kurtosis".

The parameter "skewness" (symmetry coefficient) describes the inequality of the spikes or peaks in a histogram distribution. The parameter "Kurtosis" is a measure for the course (flat/peaked) of a histogram distribution.

The calculation of the histogram parameters Skew "skewness" and Kurt "Kurtosis" occurs from the aggregate histogram of the classified image-critical sub-images according to the following equations:

Histogram Parameter Skew "Skewness", $$Skew = \frac{1}{N} \sum_{i=1}^{N} ((i - \text{Mean})/SDev)^3 * H(i)$$

Histogram Parameter Kurt "Kurtosis", $$Kurt = \frac{1}{N} \sum_{i=1}^{N} ((i - \text{Mean})/SDEV)^4 * H(i) - 3$$

The histogram parameter Skew "skewness" (symmetry coefficient) describes the inequality of the spurs of a distribution, i.e. the differences of the positive and negative deviation of the image values from the mean. The symmetry coefficient is positive when the frequency distribution has long spurs toward high values. By contrast, the symmetry coefficient is negative when the frequency distribution has long spurs toward low values. For symmetrical frequency distributions, the symmetry coefficient is approximately zero.

The histogram parameter Kurt "Kurtosis" is a measure for the course (flat/peaked) of a frequency distribution relative to the normal distribution. When the histogram parameter Kurt "Kurtosis" is small or, respectively, negative, then the frequency distribution exhibits a flat course (broad frequency distribution); when, by contrast, it is high, then the frequency distribution exhibits a peaked course (narrow frequency distribution).

Figure 14A:
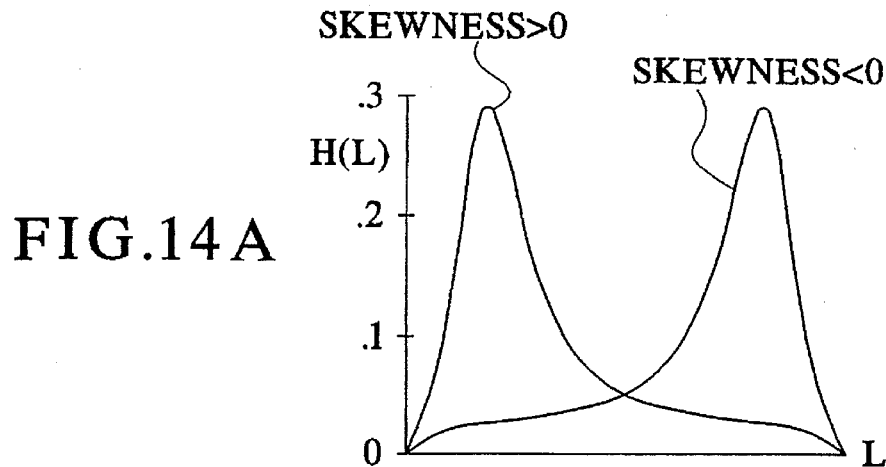
FIG. 14 shows various histogram distributions in connection with the method for the analysis of the image gradation.
Figure 14B:
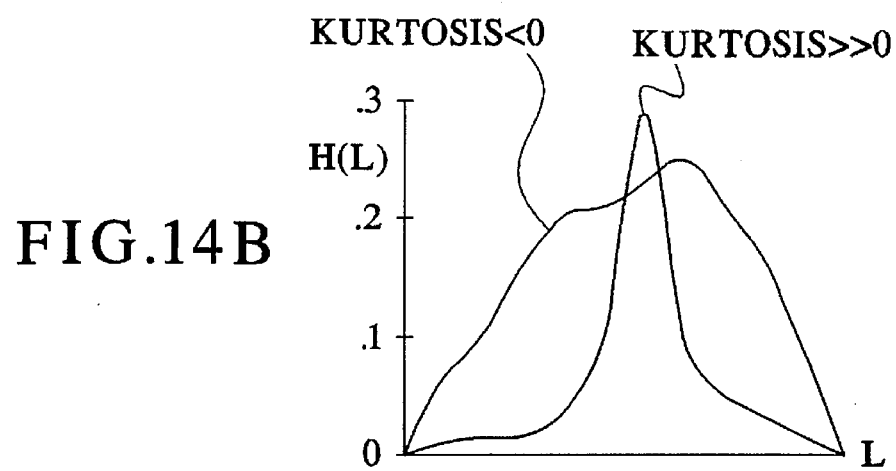

FIG. 14 shows various histogram distributions and values of the histogram parameters Skew "skewness" and Kurt "Kurtosis".

The determination of the correction factor k is advantageously undertaken dependent on the strength of the calculated contrast correction (RMS value) and/or dependent on the course of the luminance distribution of the histogram parameters Skew "skewness" and Kurt "Kurtosis" according to the following steps.

In a first step, the RMS actual value of the correction curve G=f(L) (histogram gradation is calculated. The RMS actual value corresponds to a maximum degree of correction.

Figure 15:
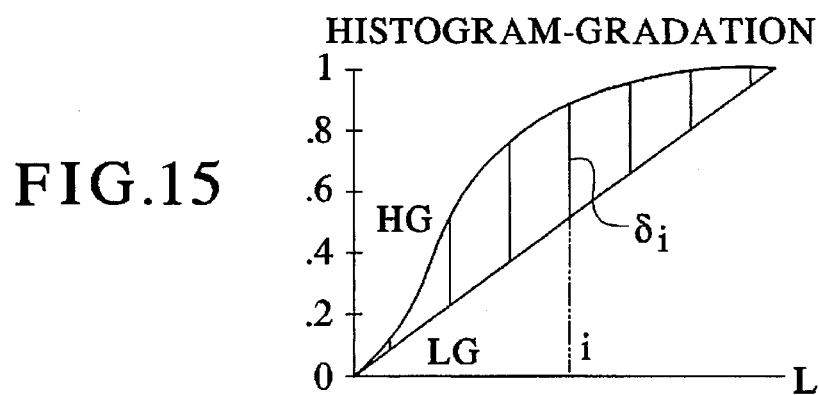
FIG. 15 shows an RMS value of a histogram gradation in connection with the method for the analysis of the image gradation.

The RMS actual value of the calculated correction curve G=f(L) (histogram gradation) is defined as root mean square of the histogram gradation (HG) from a linear gradation (LG). For this purpose, FIG. 15 shows the RMS value of a histogram gradation (HG).

The calculation of the RMS actual value ($RMS_{grd}$) of the histogram gradation (HG) ensues according to the following equation:

$$RMS_{grd} = \sqrt{\left(\sum_{i=1}^{N} \delta_i^2\right)/N}$$

wherein:

$\delta_i$=deviation of the corrected image value (histogram gradation HG) from an uncorrected image value i (linear gradation LG);

n=plurality of deviations $\delta_i$.

In a second step, the RMS rated value is identified as RMS prescribed value for the contrast correction with reference to a classification pattern.

The classification into three regions "balanced", "one-sided", and "highly one-sided" ensues by comparing the statistical histogram parameters Skew "skewness" and Kurt "Kurtosis" to defined thresholds SSw1, SSw2 or, respectively KSw1, KSw2 as follows:

Classification Pattern

| < KSw1 | > KSw1 | > KSw2 | Absolute Value | |
|--------|--------|--------|----------------|---|
| Rms 1  | Rms 2  | Rms 3  | < SSw1         | s |
| Rms 2  | Rms 3  | Rms 4  | > SSw1         | k |
| Rms 3  | Rms 4  | Rms 5  | > SSw2         | e |
|        |        |        |                | w |
|        |        |        |                | n |
|        |        |        |                | e |
|        |        |        |                | s |
|        |        |        |                | s |

The RMS prescribed values Rms, therein denote the following for the contrast correction:

Rms1=weak contrast correction

Rms2=weak contrast correction

Rms3=moderate contrast correction

Rms4=moderate contrast correction

Rms5=great contrast correction, wherein:

SSw1, SSw2=thresholds of the histogram parameter "skewness"

KSw1, KSw2=thresholds of the histogram parameter "Kurtosis".

An RMS prescribed value $Rms_i$ for the necessary contrast correction derived from the image gradation analysis derives as result of the classification.

In a third step, the required value of the correction factor k is then calculated from the RMS prescribed value $Rms_i$ (RMS rated value) and from the RMS actual value $RMS_{grd}$:

$$k = \frac{R_{msi}}{RMS_{grd}}$$

The value of the correction factor k generally lies between 0.0 (minimal correction) and 1.0 (maximum correction). When the calculation of the correction factor yields values greater than 1.0, then the value is limited to 1.0.

In the method for the analysis of a color cast, a region of high luminance values (light image region) and/or a region of low image values (dark image region) of the luminance component L* of the color values L*, a* and b* in the color original to be analyzed is sub-divided into at least one luminance region for the purpose of acquiring a color cast in the color original. The value of a potentially existing color cast in the respective luminance region (or range) is identified by averaging the color components a* and b* of the color values L*, a* and b* in the luminance regions (or ranges). The color cast value to be utilized for the evaluation of the color cast analysis is formed by selection and/or combination of color cast values calculated for the individual luminance regions (or ranges). Additionally, at least one luminance region (or range) with respect to the chrominance can be demarcated to form an analysis region by forming chrominance regions around the gray axis of a color space, whereby only the demarcated analysis region is utilized for calculating a potential color cast.

The method for the analysis of a color cast will now be disclosed in detail.

It can be appreciated that although the following description is provided with reference to the example using the color values L*, a*, b* of the CIELAB color space, of course, the color values of some other, suitable color space (see, for example, FIG. 2, color space 15) can also be utilized.

For color cast analysis, the luminance scope of the color original to be investigated is first subdivided into a region of high luminance values (light image region) and into a region of low luminance values (dark image region) of the luminance component L* of the color values and the potentially existing color casts in the two regions are separately analyzed.

It has proven expedient for a reliable identification of a color cast to subdivide the light image region and/or the dark image region into at least two luminance regions BL and BT and to separately evaluate both the individual luminance regions BL of the light image region as well as the individual luminance regions BT of the dark image regions separately with respect to a potentially existing color cast.

It has also proven advantageous to additionally demarcate the luminance regions BL and BT into respectively at least two chrominance regions BC with respect to the chrominance c*, as a result whereof the color values to be investigated can be classified into more neutral (gray) values and more chromatic values. The color cast analysis is thereby limited to slightly chromatic values, whereas all chromatic image details are excluded from the color cast analysis. Demarcated analysis regions BLC or, respectively, BTC that are separately investigated arise in this way in the color space with respect to luminance and chrominance.

The demarcation of the luminance regions BL in the light image region and of the luminance regions BT in the dark image region ensues on the basis of luminance thresholds Sw1 or, respectively, SwT, and the demarcation of the chrominance regions BC ensues on the basis of corresponding chrominance thresholds SwC.

The luminance regions BL and BT can be selected to be of the same size or of different sizes.

Since the color cast analysis can only supply valid results when the plurality of color values to be evaluated is adequately great in the demarcated analysis regions BLC or, respectively, BTC, it proves advantageous to select the size of the luminance regions BL and BT respectively dependent on the original, i.e. dependent on the respective scope of luminance of the color original to be analyzed, which is to be set forth below.

The chrominance regions BC can likewise be selected to be the same size or of different sizes. It can thereby also prove advantageous to make the size of the chrominance regions BC dependent on the properties of the respective color original.

Figure 16:
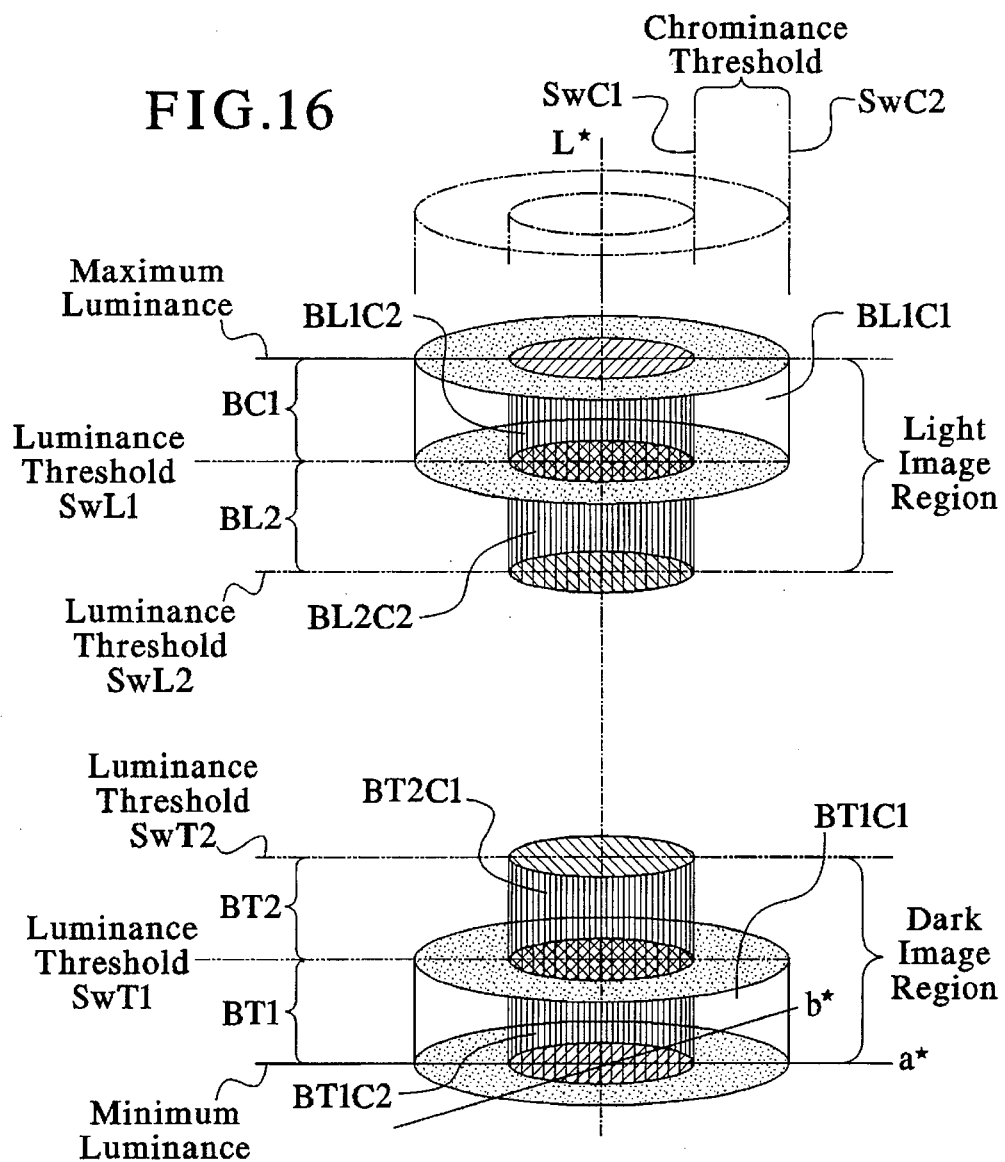
FIG. 16 illustrates a color space with a subdivision of the light image region and of the dark image region into luminance regions and chrominance regions in accordance with the method for analysis of a color cast in a color image.

FIG. 16 illustrates an L*, a*, b* color space with a subdivision of the light image region and of the dark image region into luminance regions BL and BT and chrominance regions BC. In the illustrated example, the light image region and the dark image region are respectively subdivided by luminance thresholds SwL1, SwL2 or, respectively, SwT1, SwT2 into respectively two luminance regions BL1 and BL2 or, respectively, BT1 and BT2. The analysis regions BL1C1, BL1C2 and BL2C1 in the light image region and the analysis regions BT1C1, BT1C2 and BT2C1 in the dark image region arise by an additional demarcation of the luminance regions BL1 and BL2 or, respectively, BT1 and BT2 on the basis of chrominance thresholds SwC1 and SwC2 in the chrominance regions BC1 and BC2.

After the configuration of the luminance regions or, respectively, analysis regions given additional demarcation of the luminance regions with respect to the chrominance thereof, the region-by-region evaluation of the color values of the color original to be analyzed that belong to the individual regions ensues, namely according to the same criteria in the light image region and in the dark image region.

Since, as already mentioned, the color cast analysis only supplies valid results when the plurality of color values to be evaluated is adequately large in a luminance region B1 or, respectively, BT, a minimum plurality of color values to be evaluated for the color cast identification is first defined either per luminance region BL or, respectively, BT or per light image region or, respectively, dark image region. For example, approximately 10% of the total number of color values in the light image region or, respectively, dark image region is prescribed as minimum plurality of color values for the calculation of the average color cast.

Before the actual evaluation of an analysis region BLC or, respectively, BTC, the affiliation of the color values L*, a*, b* of the color original to be analyzed to a selected analysis region BLC or, respectively, BTC must be identified. To that end, the color values L*, a*, b* are recalled in and the luminance component L* of every color value L*, a*, b* that is recalled in is first investigated by comparison to the defined luminance thresholds SwL1, SwL2, SwT1 and SwT2 to see whether it falls within the selected luminance region BL1, BL2, BT1 or BT2 or not. When the luminance component L* of a color value L*, a*, b* falls into the selected luminance region, the chrominance Cab is first calculated from the appertaining color components a* and b* of the color value L*, a*, b* and the calculated chrominance Cab is then additionally investigated with respect to the chrominance demarcation by comparison to the defined chrominance thresholds SwC1 and SwC2. The calculation of the chrominance ensues according to the equation:

$$Cab = \sqrt{a^{*2} + b^{*2}}$$

When the calculated chrominance Cab of the color value L*, a*, b* falls into the chrominance region BC1 or BC2, this color value L*, a*, b* is utilized for the identification of a potential color cast; otherwise, it is not evaluated further.

After this investigation, all color values L*, a*, b* belonging to the selected analysis region BLC have been determined, these color values being further interpreted in the following way.

A check is first carried out with reference to these color values L*, a*, b* to see whether a color cast is present in the selected analysis region BLC or, respectively, BTC.

The identification of a potential color cast ensues by separate accumulation of the color components a* and b*. When the two sums Σa* and Σb* are equal to zero, no color cast is present. When sums differing from zero result, the color original is classified as having a color cast in the respective analysis region BLC or, respectively, BTC.

When it turns out that no color cast is present, the color values L*, a*, b* of the selected analysis region BLC or, respectively, BTC are not investigated further.

When, by contrast, it turns out that a color cast is present, the color values L*, a*, b* are checked to see whether the plurality of color values L*, a*, b* available for the selected analysis region BLC or, respectively, BTC is greater than the defined minimum plurality.

When the plurality of color values L*, a*, b* available for the selected analysis region BLC or, respectively, BTC is greater than the defined minimum plurality, the value of the existing color cast for the selected analysis region BLC or, respectively, BTC is defined as an average deviation of the color values from achromatic, in that the accumulated color components Σa* and Σb* are divided by the plurality of existing color values L*, a*, b*.

The color cast values can be calculated in this way for the individual analysis regions BLC or, respectively, BTC, whereby the color cast value to be utilized for color cast correction is selected from the color cast values identified for the individual analysis regions BLC.

An advantageous alternative is comprised therein that analysis regions BLC or, respectively, BTC are combined and the color cast values for the combined analysis regions BLC or, respectively, BTC are utilized for the color cast correction. In this case, one proceeds as follows.

When it turns out that a color cast is in fact present in the selected analysis region BLC or, respectively, BTC but that the plurality of color values L*, a*, b* to be evaluated is too low, at least one adjoining analysis region BLC or, respectively, BTC is added and an enlarged analysis region is formed. The plurality of color values to be evaluated for the enlarged analysis region results from the addition of the color values L*, a*, b* available in the two analysis regions BLC or, respectively, BTC. When the minimum plurality of color values L*, a*, b* is then achieved, the color cast of the enlarged analysis region is defined by averaging the accumulated sums Σa* and Σb* of both analysis regions BLC or, respectively, BTC. Otherwise, a further analysis region BLC or, respectively, BTC is added for evaluation.

The calculation of the average color cast from the analysis regions BL1C1, BL1C2 and BL2C1 of the light image region is carried out in the following way in the examples shown in FIG. 16.

The examination is expediently begun in the analysis region having the brightest luminance and the lowest chrominance, i.e. with the analysis region BL1C1 in the example herein.

When the plurality of color values L*, a*, b* in the analysis region L1C1 is greater than the prescribed minimum plurality, then the average color cast is defined from the analysis region L1C1. Otherwise, the accumulated color components Σa* and Σb* and the plurality of color values from the analysis regions BL1C1 and BL1C2 are added. When the plurality of color values L*, a*, b* from the combined analysis regions BL1C1 and BL1C2 is greater than the prescribed minimum plurality, then the average color cast is determined from the analysis regions L1C1 and L1C2. Otherwise, the accumulated color components Σa* and Σb* and the plurality of color values L*, a*, b* from the analysis regions BL1C1, BL1C2 and BL2C1 are added. When the plurality of color values L*, a*, b* from the combined analysis regions BL1C1, BL1C2 and BL2C1 is greater than the prescribed minimum plurality, then the average color cast is determined from the analysis regions BL1C1, BL1C2 and BL2C1. Otherwise, a color cast cannot be analyzed and a color cast correction is not implemented for the color original.

The determination of the average color cast in the dark image region ensues analogously with an analysis of the regions BT1C1, BT1C2 and BT2C1.

The color cast values to be utilized for the evaluation of the color cast analysis can thus be formed by selection of color cast values identified for the individual analysis regions BLC or, respectively, BTC and/or by combination of identified color cast values.

The analyzed color cast values, as color components a* and b*, are prescribed values for the color cast correction.

The course of the a*b* color cast over the entire luminance scope can be approximately identified from the analyzed color cast values in the light image regions and dark image region. Since the average hue region is not analyzed with respect to the color cast, a linear color cast curve is assumed between light image region and dark image region.

The actual color cast correction in color originals ensues with reference to setting values calculated from the analysis results for the input devices 1, 2, 3 of FIG. 1, for example in a color scanner. Such a color cast correction is disclosed, for example, in German Patent No. DE-C-25 45 961, having counterpart U.S. Pat. No. 4,136,360, both of which are incorporated herein by reference. A color cast therein is respectively completely corrected by setting the color signal level. Often, however, it proves advantageous to implement only an alleviation of color casts.

The extent of the color cast correction can be defined with a parameter for color cast alleviation, this being defined between a minimum and a maximum color cast correction (for example, color cast alleviation zero=color cast is preserved; color cast alleviation 10=complete compensation of color cast).

Given color originals having a normal color cast, generally only a partial color cast correction is generally implemented on the basis of an average value of the color cast alleviation.

A prescribed value for the color cast alleviation is determined for the analyzed color cast in the evaluation of the analysis data. The prescribed value is thereby determined dependent on the reliability of the analyzed color cast values. Given the selection of analysis regions BLC shown in FIG. 16, the result of the color cast analysis from a small analysis region (for example BL1C1) is more reliable than the result from a larger analysis region BLC. The strength of a color cast is also affected by a certain uncertainty. Small color casts are more probable than larger color casts.

The image-dependent definition of the color cast alleviation therefore expediently ensues dependent on the evaluation region and on the degree of the analyzed color cast, for example according to the following classification pattern:

| Color Cast Evaluation Regions | | | Degree of the Analyzed |
|---|---|---|---|
| BL1S1 | BL1S2 | BL1S3 | Color Cast |
| 8 | 6 | 4 | weak |
| 6 | 5 | 3 | moderate |
| 4 | 3 | 2 | strong |

A prescribed value for the parameter of color cast alleviation for the analyzed color cast value derives as a result of this classification. Depending on the type of original (opaque/transparent), different parameter values are prescribed in the classification pattern.

The evaluation of the color cast analysis supplies the average color cast of the color original in the light image region and in the dark image region as a*b* color cast values.

a*—color cast values in the light image region=AFstL b*—color cast values in the light image region=BFstL a*—color cast values in the dark image region=AFstT b*—color cast values in the dark image region=BFstT The prescribed values FstMinL and FstMinT for the color cast alleviation in the light image region and in the dark image region determine the extent of the color cast correction, for example in the value range 0 through 10.

The corrected a*b* color cast values AFstKorL and BFstKorL can be calculated as prescribed values for a color cast correction in the light image region and the corrected a*b* color cast values AFstKorT and BFstKort can be calculated as prescribed values for a color cast correction in the dark image region, being calculated therefrom as follows.

AFstKorl=AFstL*(1.0—FstMinL/10) for light image region

BFstKorl=BFstL*(1.0—FstMinL/10) for light image region

AFstKorT=AFstT*(1.0—FstMinT/10) for dark image region

BFstKorT=BFstT*(1.0—FstMinT/10) for dark image region.

The image-dependent determination of the luminance regions shall be set forth in greater detail below.

As already mentioned above, an optimally great plurality of image values must be evaluated for the identification of the average color cast. To keep component outlay to a minimum, however, the plurality should also not be excessively great.

The determination of the brightness regions ensues dependent on the course of the frequency distribution (histogram) of the luminance component L* of the color values L*, a*, b*. The luminance histogram is calculated in a preferred, separate analysis of the color original or is taken from a previously implemented analysis of the image scope.

An example for the calculation of the luminance thresholds SwL of the luminance regions BL in the light image region is set forth with reference to FIG. 17.

Figure 17:
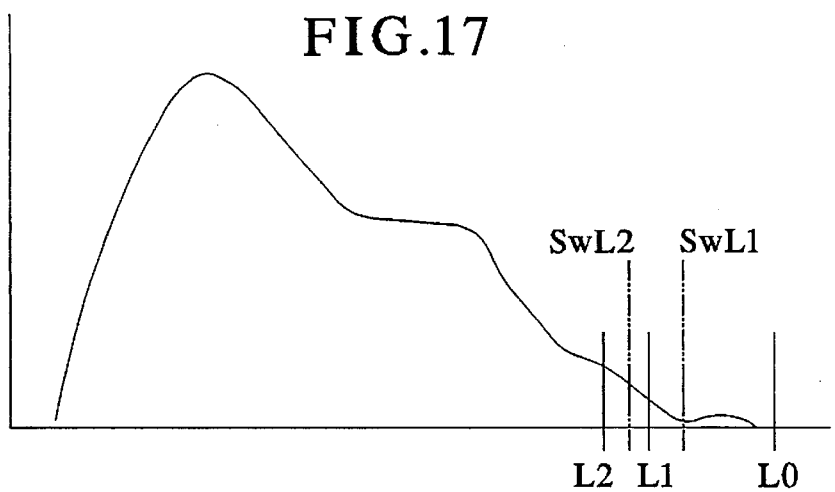
FIG. 17 shows a histogram curve with definitions for luminance thresholds in a method for the analysis of a color cast in a color image.

FIG. 17 shows a typical histogram curve with definitions for the luminance thresholds SwL1 and SwL2 for the luminance regions BL1 and BL2 according to FIG. 16. The curve of the luminance distribution in the light image region is described by a shape factor cL. The calculation of the shape factor cL ensues via luminance values as check points (quantities) L0, L1, L2 in the histogram. Proceeding from the maximum image value, the frequency values of the histogram are accumulated for calculating the check points L0, L1, L2 and those luminance values $L_1$ at which prescribed frequency thresholds are upwardly transgressed are thereby identified.

The shape factor cL is calculated from the relative position of the check points relative to one another, for example from the following relationship:

$$cL=(L1-L2)/(L0-L2)$$

The shape factor cL can thereby assume values between 0.0 and 10.0.

The luminance thresholds SwL1 and SwL2 for the determination of the two luminance regions BL1 and BL2 are defined in the following way depending on the shape factor cL between the check points L0 and L1 or, respectively, L1 and L2:

$$SwL1=(1-cL)*L1+cL*L0$$

$$SwL2=(1-cL)*L1+cL*L2$$

The calculation of the luminance thresholds SwT1 and SwT2 for the dark image region is analogously implemented.

The luminance thresholds SwT1 and SwT2 for the definition of the two luminance regions BT1 and BT2 are determined depending on the shape factor cT between the check points T0 and T1 or, respectively, T1 and T2, whereby the frequency thresholds for the check points in the dark image region can be prescribed to be larger.

$$SwT1=(1-cT)*T0+cT*T1$$

$$SwT2=(1-cT)*T1+cT*T2$$

In the method for the calibration in the conversion of image values R, G and B of the first color space 14 into the image values L*, a* and b* of the second color space 15, functionally appertaining image values L*j(s), a*j(s) and b*j(s) of the second color space 15 (communication color space) that is independent of the first color space 14 are first approximately calculated in the form of a conversion table from image values R, G and B of the first color space 14—taking the spectral and electrical properties of the input device 1, 2 or 3 into consideration—and are stored. For acquiring color values R, G, B of the first color space 14. A test original containing a plurality j of defined test colors is optoelectronically scanned with the input device 1, 2 or 3, whereby the test original respectively comprises the same material properties as the color original to be scanned with the input device 1, 2 or 3. The image values R, G and B of the first color space 14 acquired by scanning the test colors are then converted on the basis of the conversion table into the functionally allocated image values L*j(s), a*j(s) and b*j(s) of the second color space 15. The image values L*j(s), a*j(s) and b*j(s) acquired by scanning the test colors and by conversion are compared to the image values L*j(m), a*j(m) and b*j(m) of the corresponding test colors exactly calorimetrically measured for a given type of light. Finally, correction color values δL*rgb, δa*rgb, and δb*rgb for the image values L*j(s), a*j(s) and b*j(s) stored in the conversion table are calculated according to a compensation method from color difference values acquired by comparison of the image values L*j(s), a*j(s) and b*j(s) to the image values L*j(m), a*j(m) and b*j(m) of the test colors.

The method for calibration in the conversion of image values R, G, B of a first color space 14 into the image values L*, a*, b* of a second color space 15 will now be disclosed in detail.

Figure 18:
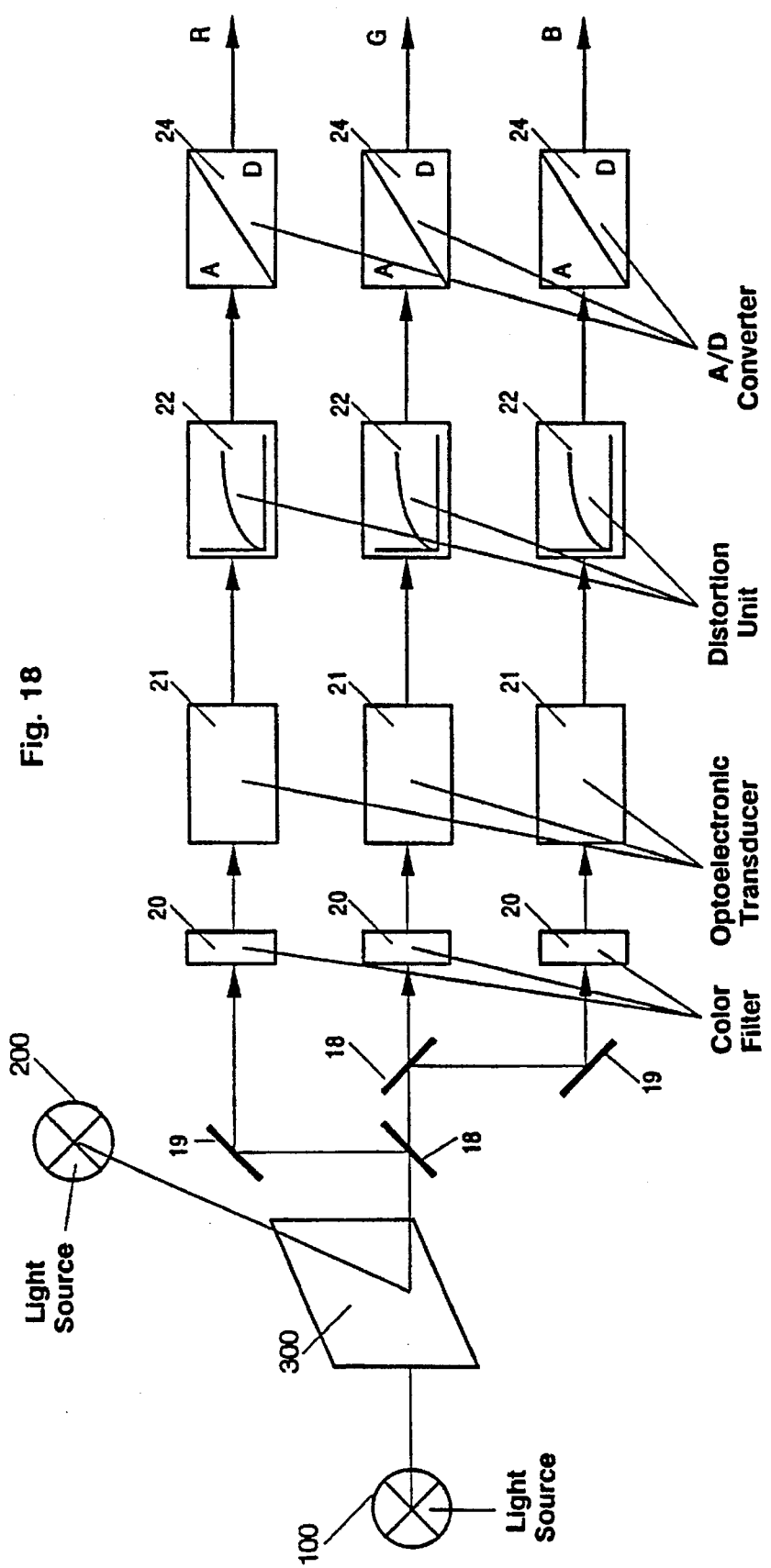
FIG. 18 shows the structure of a color image scanner for point-by-point and line-by-line trichromatic scanning of color originals in a method for calibration in the conversion of image values of a first color space into a second color space.

FIG. 18 schematically shows the structure of a color image scanner for point-by-point and line-by-line, trichromatic scanning of opaque or transparency color originals. A light source 100 for the transparency scanning or light source 200 for the opaque scanning illuminates a color original 300 point-by-point and line-by-line on the basis of a relative motion between light source 100 or 200 and color original 300. The scan light modulated with the image content of the scanned color original 300 is resolved into three sub-beams of different spectral compositions on the basis of a beam splitter block that is composed of two dichroitic mirrors 18 and two mirrors 19 and on the basis of color filters 20. The color components "red" (R), "green" (G) and "blue" (B) of the sub-beams are converted into analog measured color value signals and are amplified in optoelectronic transducers 21. The dynamic range of the analog measured color values amounts to approximately 3 to 4 powers of ten. As needed, this dynamic range can be adapted to the signal resolution of, for example, 8 bits that is standard in digital image signal processing. It is adapted thereto on the basis of signal pre-distortion in distortion units 22 adapted to the visual brightness sensation. The analog measured color value signals are converted into digital measured color values R, G, and B in analog-to-digital converters 24, and the measured color value triads of the scanned pixels are intermediately stored for further processing. The digitalization is thereby undertaken such that the digital measured color value zero corresponds to absolute black (transmission or reflection 0.0), and the digital measured color value 255 corresponds to the reference white (transmission or reflection 1.0). However, different allocations are also possible wherein an overflow region is provided in the white. Based on the knowledge of the transfer function of transmission of the color original into digital steps, the transmission values can be recovered from the digital values on the basis of an interpolation method.

Figure 19:
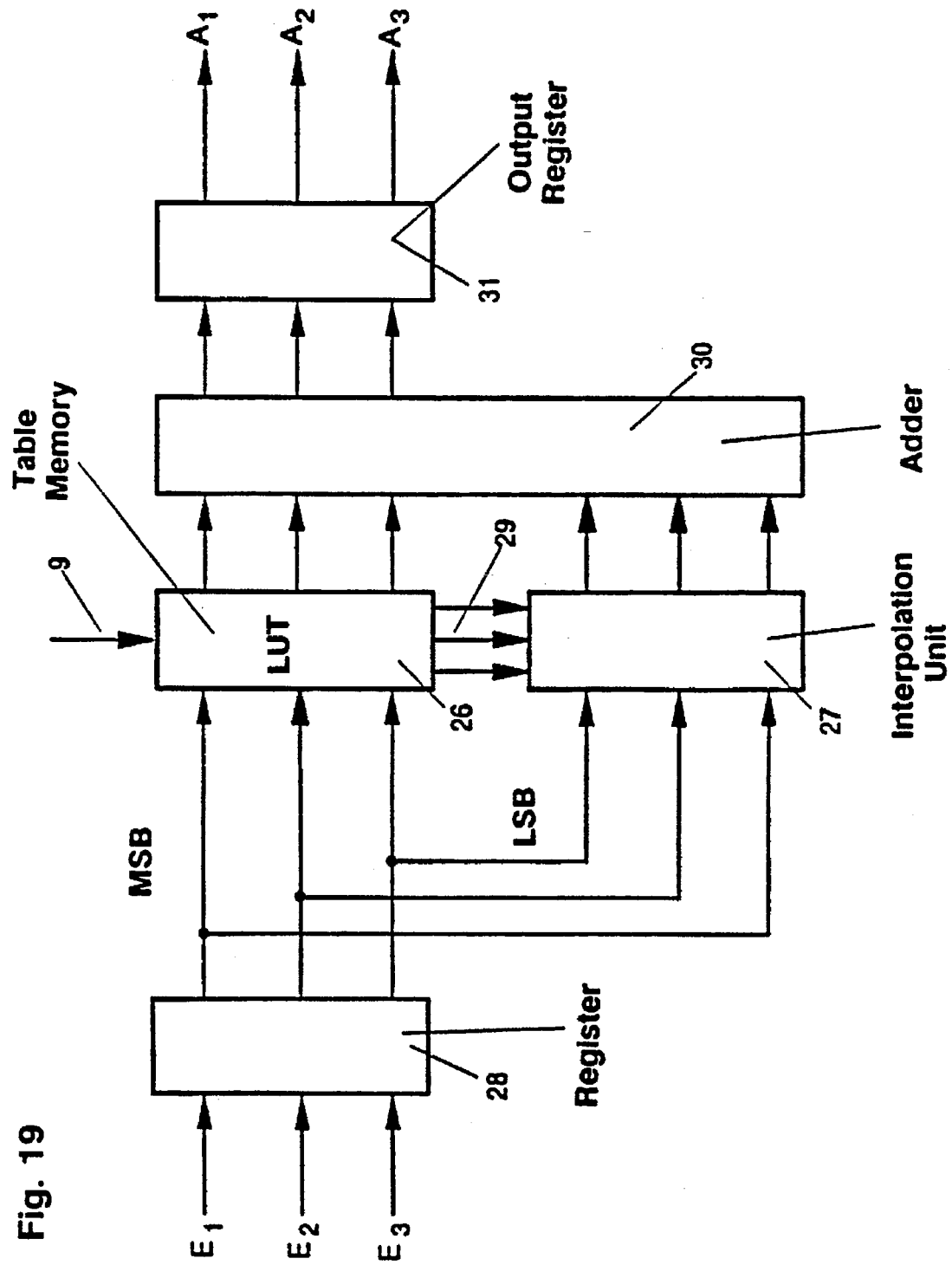
FIG. 19 shows a fundamental structure of a three-dimensional input color converter in the method for calibration of color values.

FIG. 19 shows the fundamental structure of the three-dimensional input color converter 7 comprising a three-dimensional table memory 26, also referred to as a look-up table (LUT), and comprising an interpolation unit 27 for the case wherein the conversion table is initially calculated only for a supporting value framework of roughly graduated color values, and the output color values actually required during the operation are calculated on the basis of a three-dimensional interpolation calculation. The previously calculated, roughly graduated conversion table was deposited in the table memory 26 via the input 9 of the input color converter 7. The input color values $E_1$, $E_2$ and $E_3$ of the input converter 7, for example the color values R, G, and B, are first intermediately stored in a register 28 and are resolved, for example, into five most-significant bits (MSB) and three least-significant bits (LSB) for the further operations, the most-significant bits being supplied to the table memory as addresses and the least-significant bits being supplied to the interpolation unit 27 as operand. In the interpolation unit 27, interpolation values are then calculated from the least-significant bits and the corresponding supporting values which are supplied to the interpolation unit 27 via a line 29. The interpolation values are operated with the supporting values in an adder 30 to form the output color values $A_1$, $A_2$, and $A_3$ of the input color converter 7, for example into the color values L, a, and b, and are deposited in an output register 31.

Figure 20:
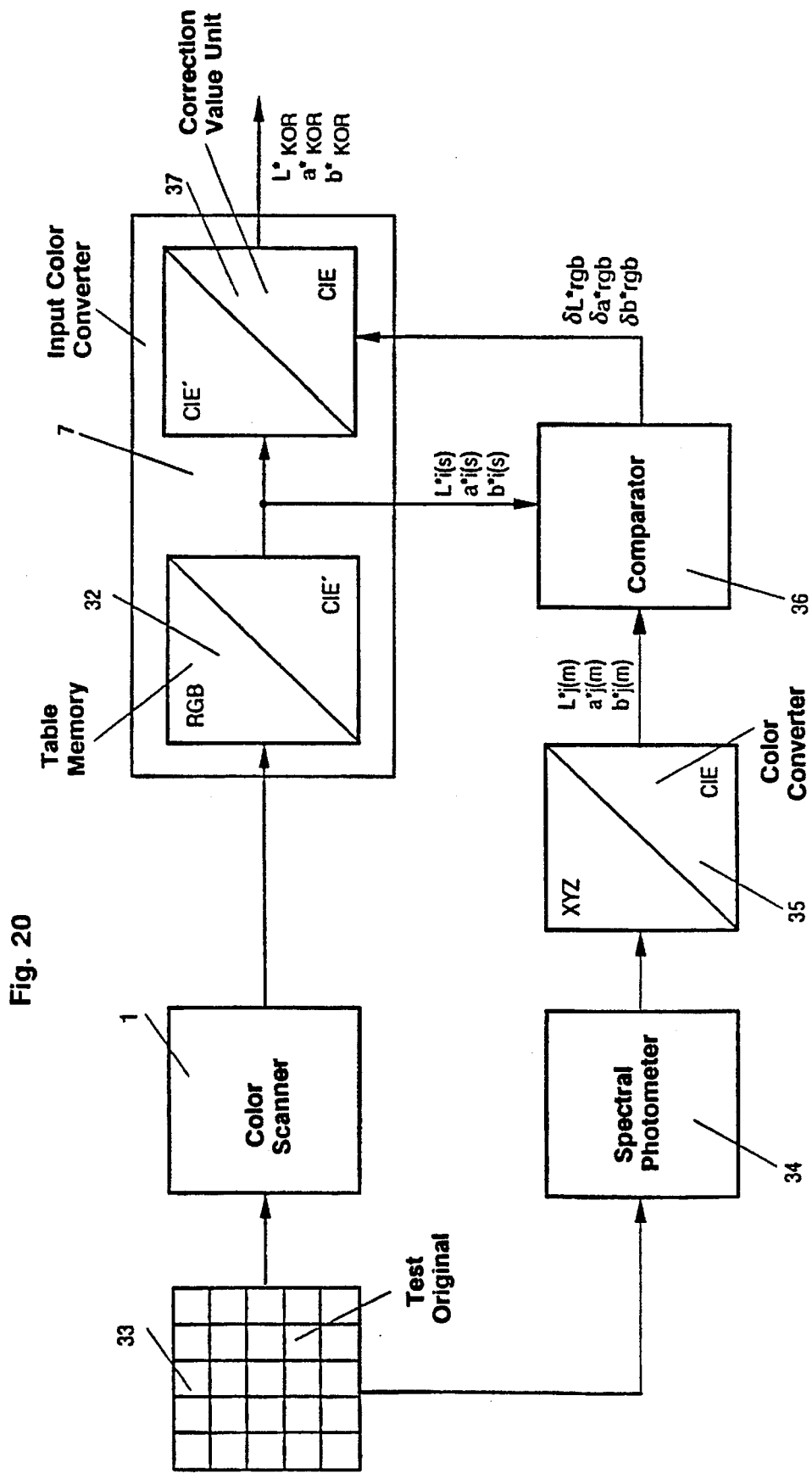
FIG. 20 shows a block diagram of the system employed in the method for calibration of color values.

FIG. 20 shows a schematic illustration of the execution of the inventive method for color calibration in the conversion of the color values of an apparatus-dependent input color space into the color values of a communication color space that is independent of the input color space.

In the example set forth below, the color values R, G, and B of the RGB color space of a color image scanner I are transformed into the color values L*, a*, and B* of the CIELAB color space, whereby the following method steps (A) through (E) are implemented.

Method Step (a)

In a method step (A), an approximated conversion table for the input color converter 7 is produced and is stored in a table memory 32 of the input color converter 7. The functionally corresponding color values $L^*_f(s)$, $a^*_f(s)$, and $b^*_f(s)$ of the independent CIELAB color space (15) are approximately calculated from color values R, G, and B of the RGB color space 14, taking the spectral and electrical properties of the color image scanner 1 into consideration. The metamerism problems arising due to different color pigments can thereby be simultaneously taken into consideration. The approximate calculation of the color values $L^*_f(s)$, $a^*_f(s)$, and $b^*_f(s)$ of the conversion table is implemented in the following steps.

In a first step ($A_1$), the potentially pre-distorted color values R, G, and B of the color image scanner (1) are linearized according to equation [1].

$$(R,G,B) = f^{-1}(R,G,B) \quad [1]$$

In a second step ($A_2$), the color values R, G, and B are matricized according to equation [2] into the corresponding standard color values X, Y, and Z with the assistance of matrix coefficients (M):

$$(X,Y,Z) = M(R,G,B) \quad [2]$$

In a third step ($A_3$), the standard color values X, Y, and Z are standardized according to equation [3], taking the type of illumination light (reference white) into consideration.

$$(X,Y,Z) = A(X,Y,Z) \quad [3]$$

In a fourth step ($A_4$), the standard color values X, Y, and Z are then transformed into the color values L*, a*, and b* of the communication color space 15 according to equation [4].

$$(L^*,a^*,b^*) = f(X,Y,Z) \quad [4]$$

In a fifth step ($A_5$), finally the color values L*, a*, and b*, are quantized according to equation [5], $$(Lq, aq, bq) = f(L^*, a^*, b^*) \quad [5]$$

and the quantized color values (L*, a*, b*) are stored in the table memory 26 of the input color converter 7.

Due to the selection of the five most-significant bits for addressing the table memory 26, a graduation of the conversion table of eight derives for all three input color values R, G, and B. Output color values Lq, aq, and bq must thus be calculated for all combinations {R, G, B}={0, 8, 16, 248}.

The calculation of the approximation solution according to steps ($A_1$) through ($A_5$) is based on the following relationships.

The measurement of the color values in a color original in a color image scanner generally occurs according to the three-region method. The spectral value functions of the scanner unit must correspond to those of a standard observer of the CIE from 1931 or a suitable linear combination thereof. The spectral value functions (r, g, b) derive from equations [6] as follows:

$$r(\lambda) = c_r \times S(\lambda) \times \tau_r(\lambda) \times R(\lambda)$$

$$g(\lambda) = c_g \times S(\lambda) \times \tau_g(\lambda) \times R(\lambda)$$

$$b(\lambda) = c_b \times S(\lambda) \times \tau_b(\lambda) \times R(\lambda) \quad (6)$$

$r(\lambda)$, $g(\lambda)$, $b(\lambda)$=spectral value functions of the color image scanner $C_r$, $C_g$, $C_b$=apparatus constant (amplification factors)

$\tau_r$, $\tau_g$, $\tau_b$=spectral transmission curves of the color filters $S(\lambda)$, $R(\lambda)$=spectral value functions of light source and light receiver.

Upon employment of equations [6], the color values R, G, and B derive by integration of the color stimulus function of the color original after convolution with the spectral value curves according to equations [7] as:

$$R = \int_{380\,nm}^{780\,nm} \Phi(\lambda) \times r(\lambda) \times d\lambda \quad [7]$$

$$G = \int_{380\,nm}^{780\,nm} \Phi(\lambda) \times g(\lambda) \times d\lambda$$

$$B = \int_{380\,nm}^{780\,nm} \Phi(\lambda) \times b(\lambda) \times d\lambda$$

with $\Phi(\lambda)$=color stimulus function of the color original.

The color values R, G, and B are then usually adapted to the visual sensation of the human eye on the basis of a pre-distortion before they are digitized and transmitted. This pre-distortion must then be cancelled in the calculation of the approximation solution according to step ($A_1$) before the transformation of the color values R, G, and B into the standard color values X, Y, and Z.

The transformations of the color values R, G, and B into the standard color values X, Y, and Z of the standard color space CIE XYZ of 1931 according to step ($A_2$) for calculation of the approximation solution is implemented with the assistance of matrixing coefficients M according to equations [8].

$$\begin{aligned} X &= M_{11}M_{12}M_{13} & R \\ Y &= M_{21}M_{22}M_{23} \times & G \\ Z &= M_{31}M_{32}M_{33} & B \end{aligned} \quad [8]$$

Given knowledge of the spectral functions of the scanner unit, the identification of the matrixing coefficients M can occur on the basis of an adaptative calculation. When the spectral functions are not known, the matrixing coefficients M must be experimentally identified by measuring colorimetrically defined color fields of a color table.

In the present example, the identification of the matrixing coefficients M occurs by adaptation of the spectral value functions, whereby the adaptation occurs such that the sum of the error squares becomes minimum over a large plurality of spectral supporting points. The identification of the matrixing coefficients M occurs according to equations [9] as follows:

$$\Sigma_i(M_{11} \times r_i + M_{12} \times g_i + M_{13} \times b_i - x_i)^2 = Min$$

$$\Sigma_i(M_{21} \times r_i + M_{22} \times g_i + M_{23} \times b_i - y_i)^2 = Min$$

$$\Sigma_i(M_{31} \times r_i + M_{32} \times g_i + M_{33} \times b_i - z_i)^2 = Min \quad [9]$$

with $r_i, g_i, b_i$=supporting values of the spectral value function of the color image scanner $x_i, y_i, z_i$=supporting values of the standard spectral value functions of the CIE of 1931 XYZ and i=spectral supporting point in the range from 380 nm through 780 nm with 10 nm intervals.

The calculation of the matrixing coefficients M is numerically simple and is implemented by variation of the coefficients, whereby standardizing is subsequently carried out such that standard color values X, Y, Z=1.0 are achieved for R, G, B=1.0. As a result of this matching of the color values on the same signal level given a reference white, standard color values are calculated that are referred to the light type E of the isoenergetic spectrum. When one of the light types standard in reproduction technology is desired as white reference, then this must be implemented by the "von Kries" transformation for change of chromatic adaptation known from the literature. This occurs by a renewed matrixing of the XYZ color values. This matrix can be calculated with the matrix recited in equations [8].

The transformation of the standard color values X, Y and Z of the standard color space CIEXYZ into the color values L*, a* and b* of the CIELAB color space according to step (A₄) for calculating the approximation solution is implemented according to equations [10] in the following way:

$$L^* = 116 \times f(Y/Yn) - 16$$

$$a^* = 500 \times [f(X/Xn) - f(Y/Yn)]$$

$$b^* = 200 \times [f(Y/Yn) - f(Z/Zn)] \quad [10]$$

with $$\begin{aligned} f(X/Xn) &= (X/Xn)^{1/3} & \text{for } X/Xn > 0.008856 \\ &= 7.787 \times (S/Sn) + 16/116 & \text{for } X/Xn < 0.008856 \\ f(Y/Yn) &= (Y/Yn)^{1/3} & \text{for } Y/Yn > 0.008856 \\ &= 7.787 \times (Y/Yn) + 16/116 & \text{for } Y/Yn < 0.008856 \\ f(Z/Zn) &= (Z/Zn)^{1/3} & \text{for } Z/Zn > 0.00856 \\ &= 7.787 \times (Z/Zn) + 16/116 & \text{for } Z/Zn < 0.00856 \end{aligned}$$

and Xn, Yn, Zn as white reference of the desired white type.

The above-explained calculations are equivalently implemented for other color spaces.

The color values L*, a*, and b* calculated according to equation [10] must be imaged onto the existing digital stages or the internal representation. The value range of the brightness L* lies between 0 and 100; the value range of the variegations a* and b* of body colors based on experience lie between −100 and +100. Given an internal resolution of 8 bits or 256 digital stages, the said value ranges are to be imaged thereon.

The luminance L* can be imaged onto the full scope of the digital stages with the assistance of a scaling factor. A shift of the zero point in order to work only with positive values is necessary in the variegations a* and b* dependent on the implementation of the interpolation steps of the color converter. A possible quantization can occur according to equation [11].

$$L_q = [L_f \times L^*]$$

$$a_q = [a_f \times a^*] + a_n$$

$$b_q = [b_f \times b^*] + b_n \quad [11]$$

with $L_q$, $a_q$, $b_q$=quantized CIELAB color values $L_f$, $a_f$, $b_f$=quantization factors $a_n$, $b_n$=zero point offset

[. . . ]=rounding function to the next whole number and $L_f=255/100$, $a_f$, $b_f=100/128$, $a_n$, $b_n=128$.

Method Step (b)

In a method step (B), a suitable test original 33 that contains a plurality j of defined test colors is optoelectronically scanned with the color image scanner 1, whereby the test original 33 respectively comprises the same material properties as the color original 300 to be scanned later with the color image scanner 1, and the color values R, G, and B of the RGB color space 14 acquired therewith are converted into the functionally allocated color values L*ⱼ(s), a*ⱼ(s) and b*ⱼ(s) of the communication color space 15 on the basis of the conversion table calculated in method step (A), and are deposited in the table memory 32 of the input color converter 7.

For example, a color table having a plurality j of color fields such as, for example, the color tables of the Kodak Company (Q60-A, -B, -C) can be employed as test original 33. The plurality of color fields and their frequency distribution must be suitably selected for the calibration method. The color fields should cover the color space of the color original visually uniformly distributed, preferably overproportionally covering the region of less variegated colors since less variegated colors occur more frequently than highly variegated colors. The color fields have their scope of luminance matched to the scope contained in the approximation solution. This is expediently undertaken at the brightest color field of the test original. The matching factor can be stored for a calculation of absolute original color values.

Method Step (C)

In a method step (C), the test colors of the test original 33 are measured with a spectral photometer 34 as standard color values X, Y, and Z for a prescribed light type and the standard color values X, Y, and Z are converted into the colorimetrically exact color values $L^*_j(m)$, $a^*_j(m)$, and $b^*_j(m)$ of the communication color space 15 in a color converter 35.

Instead of a spectral photometer, a colorimeter or a correspondingly calibrated input apparatus, particularly a color scanner 1, can also be employed.

Method Step (D)

In a method step (D), the color values $L^*_j(s)$, $a^*_j(s)$, and $b^*_j(s)$ of the test color calculated in method step (A) are compared to the color values $L^*_j(m)$, $a^*_j(m)$, and $b^*_j(m)$ of the corresponding test colors calculated in method step (C) in a comparator 36, and color difference values $L^*_j(m)-L^*_j(s)$, $a^*_j(m)-a^*_j(s)$, and $B^*_j(m)-b^*_j(s)$ are calculated from the comparison.

Method Step (E)

In a method step (E), correction color values $\delta L^*_{rgb}$, $\delta a^*_{rgb}$, and $\delta b^*_{rgb}$ in the form of a correction value table are then calculated from the color difference values $L^*_j(m)-L^*_j(s)$, $a^*_j(m)-a^*_j(s)$, and $b^*_j(m)-b^*_j(s)$, and the corrected color values $L^*_{KOR}$, $a^*_{KOR}$, and $b^*_{KOR}$ are calculated in a correction value unit 37 on the basis of a weighted addition of correction color values $\delta L^*_{rgb}$, $\delta a^*_{rgb}$, and $\delta b^*_{rgb}$, and color values $L^*_j(s)$, $a^*_j(s)$, and $b^*_j(s)$ of the approximated conversion table according to equation [12].

$$L^*_{KOR}=L^*_{rgb}+\delta L^*_{rgb}$$
$$a^*_{KOR}=a^*_{rgb}+\delta a^*_{rgb}$$
$$b^*_{KOR}=b^*_{rgb}+\delta b^*_{rgb} \quad [12]$$

Two courses can be embarked upon for calculating the corrected color values $L^*_{KOR}$, $a^*_{KOR}$, and $b^*_{KOR}$. First, the correction color values $\delta L^*_{rgb}$, $\delta a^*_{rgb}$, and $\delta b^*_{rgb}$ can be stored and, during the actual original scanning following the calibration phase, can be continuously added to the color values $L^*_j(s)$, $a^*_j(s)$, and $b^*_j(s)$ of the conversion table in the correction value unit 37. Second, the addition of the correction color values $\delta L^*_{rgb}$, $\delta a^*_{rgb}$, and $\delta b^*_{rgb}$ and of the color values $L^*_j(s)$, $a^*_j(s)$, and $b^*_j(s)$ can occur in the calibration phase. The corrected color values $L^*_{KOR}$, $a^*_{KOR}$, and $b^*_{KOR}$ are then stored in the correction value unit 37 and are read out from the correction value unit 37 during the original scanning and are further processed.

Expediently, the color values $L^*_j(s)$, $a^*_j(s)$, and $b^*_j(s)$ of the approximate conversion table and the corresponding correction color values $\delta L^*_{rgb}$, $\delta a^*_{rgb}$, and $\delta b^*_{rgb}$ are calculated only for a supporting value framework of the theoretically possible color space, and the corrected color values $L^*_{KOR}$, $a^*_{KOR}$, and $b^*_{KOR}$ actually required in the color conversion executed later are calculated by interpolation in the supporting framework.

Given a supporting value framework having, for example, 32×32×32=32768 supporting points for the color values, it is expedient to implement the input color calibration according to a compensation method having a smaller plurality of color values.

The calculation of the correction color values $\delta L^*_{rgb}$, $\delta a^*_{rgb}$, and $\delta b^*_{rgb}$ according to the compensation method advantageously occurs on the basis of a colorimetric interval weighting with a weighting or interval function f(rgb, i) according to equation [13].

$$\delta L^*_{rgb}=\Sigma_i[f(rgb,i)\times(L^*_i(m)-L^*_i(S))]/\Sigma_i[f(rgb,i)]$$
$$\delta a^*_{rgb}=\Sigma_i[f(rgb,i)\times(a^*_i(m)-a^*_i(s))]/\Sigma_i[f(rgb,i)]$$
$$\delta b^*_{rgb}=\Sigma_i[f(rgb,i)\times(b^*_i(m)-b^*_i(s))]/e\Sigma_i[f(rgb,i)] \quad [13]$$

whereby $\delta L^*_{rgb}$, $\delta a^*_{rgb}$=correction color values $L^*_j(s)$, $a^*_j(s)$, $b^*_j(s)$=exact color values of a test color i $L^*_j(m)$, $a^*_j(m)$, $b^*_j(m)$=approximated color values of a test color i and f(rgb,i)=interval function.

The summation i thereby proceeds over all color fields of the test original 33.

The interval function f(rgb,i) is expediently an inverse function of the fourth order according to equation [14]

$$f(rgb,i)=1/[L^*rgb-L^*_i(m))^2+(a^*rgb-a^*_i(m))^2+(b^*rgb-b^*_i(m))^2]^2 \quad [14]$$

The interval function f(rgb,i) takes color fields of the test original 33 in the proximity of the current supporting point into greater consideration than more remote color fields. The selection of the interval function defines the quality and convergence of the method. Average value and standard deviation as characteristics of the quality of the color conversion can be calculated with known methods.

The color calibration is thus ended and the actual scanning of the color original to be reproduced can begin. When it thereby turns out that the errors and the standard deviation are too great in a specific application, the color calibration can be repeated with a new, approximated conversion table until the desired deviation is achieved or fallen below.

Although modifications and changes may be suggested by those skilled in the art, it is the intention of the inventors to embody within the patent warranted hereon all changes and modifications as reasonably and properly come within the scope of their contribution to the art.

I claim:

1. A method for master analysis of an image original to be reproduced by evaluating image values acquired by point-by-point and line-by-line trichromatic scanning of an image original with an image processing input device, comprising the steps of:

transforming each scanned image value of a first RGB color space allocated to the input device into: a corresponding image value of a CIEXYZ color value system as a reference color system based on visual properties of the human eye, and then transforming each image value in the CIEXYZ system into a corresponding image value of a device independent second color space that is independent of the first color space, said second color space having an equidistant three-dimensional construction and is in conformity with human sensation, the image values of the second color space including a luminance component and first and second color components; and carrying out an automatic master analysis of the image original for calculating setting values for the image processing for image scope, image gradation, and color cast on the basis of the transformed image values of the second color space without manual intervention by an operator.

2. The method of claim 1, comprising the steps of:

calculating and identifying a frequency distribution of a luminance component of the transformed image values in the image original; and calculating a light image value of the image original and a dark image value of the image original from the frequency distribution by defining maximum and minimum luminance values depending on a curve of a frequency distribution of light image and dark image regions in the image original.

3. The method of claim 1, comprising the steps of:

subdividing a value range of a luminance component of the image values into luminance regions;

identifying an affiliation of the image values to said luminance regions;

checking said luminance regions for a potentially existing color cast for each luminance region;

calculating corresponding color cast values for the image values belonging to the individual luminance regions from the color components by averaging; and identifying an overall color cast value to be utilized for evaluation of a color cast of the image original by combining the color cast values identified for the luminance regions.

4. The method of claim 3, comprising the steps of:

undertaking subdivision into said luminance regions in an image region of highest luminance values and in an image region of lowest luminance values; and additionally demarcating the highest luminance values image luminance region and the lowest luminance values image luminance region based on chrominance by forming chrominance regions around a gray axis to form analysis regions and utilizing the analysis regions for checking for potentially existing color casts.

5. The method of claim 1, wherein the master analysis of an image original takes place with reference to image values that are acquired by scanning the image original with a resolution that is coarser than a resolution required for the reproduction of the image original.

6. A method according to claim 1 wherein two color components are provided and wherein hue and chroma are directly derived from the two color components.

7. A method according to claim 1 wherein the second color space is a CIELAB color space having color values L*, a*, and b* where L* represents luminance, a* represents said first color component, and b* represents said second color component.

8. An apparatus for master analysis of an image original to be reproduced by evaluating the image values acquired by point-by-point and line-by-line, trichromatic scanning with an input device, comprising:

a color converter connected to the input device for transforming each scanned image value of a first RGB color space allocated to the input device into a corresponding image value of a CIEXYZ color value system as a reference color system based on visual properties of the human eye, and then transforming each image value into the CIEXYZ system into a corresponding image value of a second color space that is independent of the first color space, said second color space having an equidistant three-dimensional construction and in conformity with human sensation, the image values of the second color space including a luminance component and first and second color components;

an image processing unit connected to the color converter and configured for processing the transformed image values;

an operating terminal coupled to both the color converter and the image processing unit;

a communication unit connected to the image processing unit for intermediate storage of processed image values; and a master analysis unit connected to the image processing unit and to the operating terminal for conducting an automatic master analysis of an image original based on the transformed image values of the second color space for the purpose of calculating setting values for image processing for image scope, image gradation, and color cast without manual intervention by an operator.

9. A method for master analysis of an image original to be reproduced by evaluating image values acquired by point-by-point and line-by-line trichromatic scanning of an image original with an image processing input device, comprising the steps of:

transforming each scanned image value of a first RGB color space allocated to the input device into a corresponding image value of a CIEXYZ color value system as a reference color system based on visual properties of the human eye, and then transforming each image value in the CIEXYZ system into a corresponding image value of a device independent second color space that is independent of the first color space, said second color space having an equidistant three-dimensional construction and is in conformity with human sensation, the image values of the second color space including a luminance component and first and second color components;

calibrating the conversion of image values of the first color space into the image values of the second color space by forming a conversion table from image values of the first color space, taking spectral and electrical properties of the input device into consideration;

opto-electronically scanning a test image original containing a plurality of defined test colors with the input device for acquiring image values of the first color space, the test image original comprising the same material properties as the image original to be scanned later with the input device;

converting the image values of the first color space acquired by scanning the test image original into image values of the second color space with reference of the conversion table;

comparing the image values of the second color space acquired by scanning the test image original to image values of the corresponding test color values colorimetrically measured for a given type of light to acquire color difference values;

calculating correction color values for the image values stored in the conversion table according to said color difference values; and carrying out an automatic master analysis of the image original for calculating setting values for the image processing for image scope, image gradation, and color cast on the basis of the transformed image values of the second color space without manual intervention by an operator.

10. An apparatus for master analysis of an image original to be reproduced by evaluating the image values acquired by point-by-point and line-by-line, trichromatic scanning with an input device, comprising:

- a color converter connected to the input device for transforming each scanned image value of a first RGB color space allocated to the input device into a corresponding image value of a CIEXYZ color value system as a reference color system based on visual properties of the human eye, and then transforming each image value into the CIEXYZ system into a corresponding image value of a second color space that is independent of the first color space, said second color space having an equidistant three-dimensional construction and in conformity with human sensation, the image values of the second color space including a luminance component and first and second color components;
- an image processing unit connected to the color converter and configured for processing the transformed image values;
- an operating terminal coupled to both the color converter and the image processing unit;
- a communication unit connected to the image processing unit for intermediate storage of processed image values; and
- a master analysis unit connected to the image processing unit and to the operating terminal for conducting an automatic master analysis of an image original based on the transformed image values of the second color space for the purpose of calculating setting values for image processing for image scope, image gradation, and color cast without manual intervention by an operator.

11. An apparatus according to claim 10 wherein two color components are provided and wherein hue and chroma are directly derived from the two color components.

12. An analysis according to claim 10 wherein the second color space is a CIELAB color space having color values L*, a*, and b* where L* represents luminance, a* represents said first color component, and b* represents said second color component.

13. A method for master analysis of an image original to be reproduced by evaluating image values acquired by point-by-point and line-by-line, trichromatic scanning of an image original with an image processing input device, comprising the steps of:

- transforming each scanned image value of a first RGB color space allocated to the input device into a corresponding image value of a CIEXYZ color value system as a reference color system based on visual properties of the human eye, and then transforming each image value in the CIEXYZ system into a corresponding image value of a second color space that is independent of the first color space, the image values of the second color space including a luminance component and first and second color components, the second color space having an equidistant three-dimensional construction in conformity with human sensation; and
- carrying out an automatic master analysis of the image original for calculating setting values for the image processing on the basis of the transformed image values of the second color space, said setting values being carried out for image scope, image gradation, and color cast, the analysis for the color cast using the first and second color components, and the analysis for the image scope and the image gradation using the luminance component.

* * * * *